US012737435B2

(12) United States Patent
Xu et al.

(10) Patent No.: US 12,737,435 B2
(45) Date of Patent: Sep. 15, 2026

(54) DEEP NEURAL NETWORKS VIA PROTOTYPE FACTORIZATION

(71) Applicant: Robert Bosch GmbH, Stuttgart (DE)

(72) Inventors: Panpan Xu, Santa Clara, CA (US); Liu Ren, Saratoga, CA (US); Zeng Dai, Santa Clara, CA (US); Junhan Zhao, Melrose, MA (US)

(73) Assignee: Robert Bosch GmbH (DE)

( * ) Notice: Subject to any disclaimer, the term of this patent is extended or adjusted under 35 U.S.C. 154(b) by 1361 days.

(21) Appl. No.: 17/509,764

(22) Filed: Oct. 25, 2021

(65) Prior Publication Data

US 2022/0138511 A1 May 5, 2022

Related U.S. Application Data

(60) Provisional application No. 63/108,192, filed on Oct. 30, 2020.

(51) Int. Cl.

| | |
|---|---|
| ***G06N 3/045*** | (2023.01) |
| ***G06F 18/20*** | (2023.01) |
| ***G06F 18/2113*** | (2023.01) |
| ***G06F 18/214*** | (2023.01) |
| ***G06F 18/241*** | (2023.01) |
| ***G06F 18/2413*** | (2023.01) |
| ***G06N 3/0464*** | (2023.01) |
| ***G06N 3/08*** | (2023.01) |
| ***G06N 3/082*** | (2023.01) |

(Continued)

(52) U.S. Cl.
CPC .... *G06F 18/24133* (2023.01); *G06F 18/2113* (2023.01); *G06F 18/2148* (2023.01); *G06F 18/285* (2023.01); *G06N 3/082* (2013.01)

(58) Field of Classification Search
CPC ........... G06N 5/022; G06N 5/01; G06N 5/04; G06N 20/20
See application file for complete search history.

(56) References Cited

PUBLICATIONS

Wu et al., "Compressing Deep Neural Networks With Sparse Matrix Factorization" (hereinafter Wu), Nov. 14, 2019 IEEE Transactions on Neural Networks and Learning Systems, vol. 31, No. 10 (Year: 2019).*

(Continued)

*Primary Examiner* — Kakali Chaki
*Assistant Examiner* — Josep Han
(74) *Attorney, Agent, or Firm* — Dickinson Wright PLLC

(57) ABSTRACT

A method may include receiving a set of images, analyzing the images, selecting an internal layer, extracting neuron activations, factorizing the neuron activations via a matrix factorization algorithm to select prototypes and generate weights for each of the selected prototypes, replacing the neuron activations of the internal layer with the selected prototypes and the weights for the selected prototypes, receiving a second set of images, classifying the second set of images using the prototypes and weights, displaying the second set of images, selected prototypes, and weights, displaying predicted results and ground truth for the second set of images, providing error images based on the predicted results and ground truth; identifying error prototypes of the selected prototypes associated with the error images; ranking error weights of the error prototypes, and outputting a new image class based on the error prototypes being one of a top ranked error weights.

20 Claims, 21 Drawing Sheets

(51) Int. Cl.
*G06N 3/084* (2023.01)
*G06N 3/09* (2023.01)
*G06N 20/00* (2019.01)
*G06V 10/82* (2022.01)

(56) References Cited

PUBLICATIONS

Pleiss et al., "Identifying Mislabeled Data using the Area Under the Margin Ranking" (hereinafter Pleiss) arXiv:2001.10528v1 [cs.LG] Jan. 28, 2020 (Year: 2020).*

Waymo, "Waymo open dataset" © 2019 Waymo LLC archive viewable on Nov. 2, 2019 https://web.archive.org/web/20191102074632/https://waymo.com/open/about/ (Year: 2019).*

Kanani et al., "ECG Heartbeat Arrhythmia Classification Using Time-Series Augmented Signals and Deep Learning Approach" (hereinafter Kakani) Available online Jun. 4, 2020, Third International Conference on Computing and Network Communications (CoCoNe' 19) (Year: 2020).*

Tuncel et al., "How to clearly articulate results and construct tables and figures in a scientific paper?", May 15, 2013 © Copyright 2013 by Turkish Association of Urology (Year: 2013).*

Collins, Edo, Radhakrishna Achanta, and Sabine Susstrunk. "Deep feature factorization for concept discovery." Proceedings of the European Conference on Computer Vision (ECCV). 2018. (Year: 2018).*

Oscar Li, Hao Liu, Chaofan Chen, and Cynthia Rudin. 2018. Deep Learning for Case-based Reasoning through Prototypes: A Neural Network that Explains its Predictions. In AAAI Conference on Artificial Intelligence, 8 pages.

J. L. Kolodner. An introduction to case-based reasoning. Artificial Intelligence Review, 6(1):3-34, Mar. 1992. doi: 10.1007/BF00155578, 32 pages.

F. Hohman, H. Park, C. Robinson, and D. H. Chau. Summit: Scaling deep learning interpretability by visualizing activation and attribution summarizations. IEEE Transactions on Visualization and Computer Graphics (TVCG), 2020, 11 pages.

P. J. Rousseeuw. Silhouettes: a graphical aid to the interpretation and validation of cluster analysis. Journal of computational and applied mathematics, 20:53-65, 1987, 13 pages.

* cited by examiner

Class: SVEB

Class: VEB
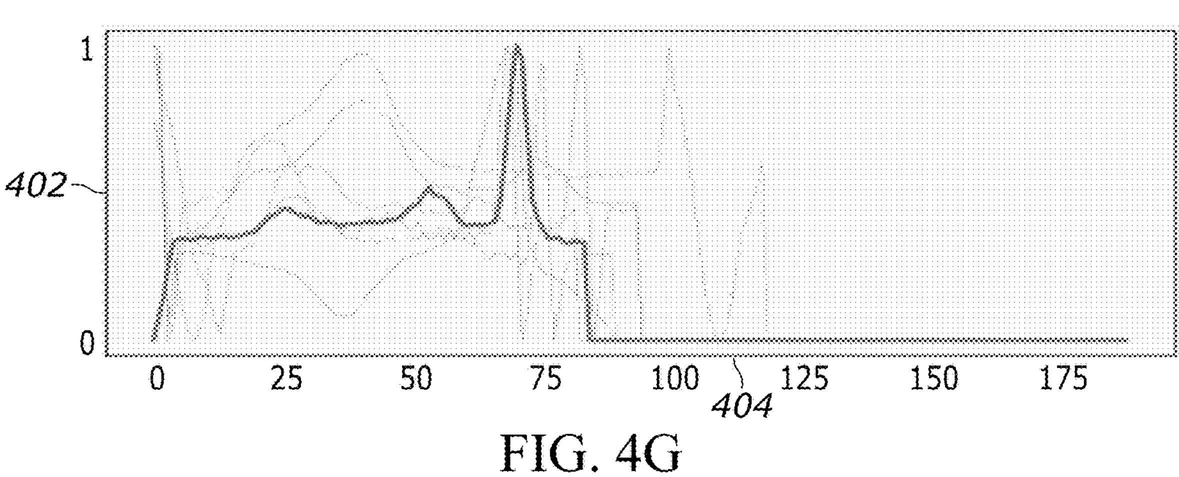
FIG. 4G
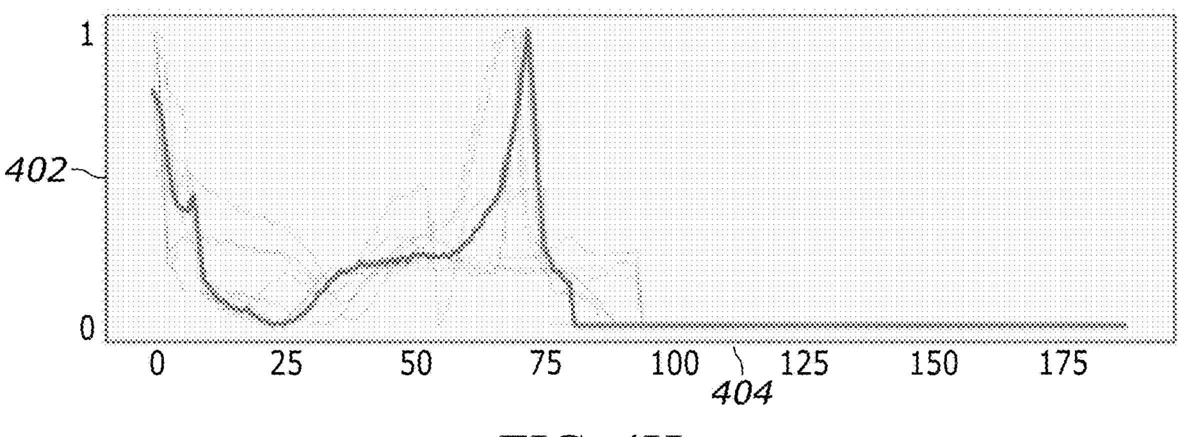
FIG. 4H
1
0
402
0 25 50 75 100 125 150 175
404
FIG. 4I 600 Which Of The Following Options Do You Think Can Be Used To Explain The Image (On The Left) And Its Caption (Label)? Select One Of The Given Options: *

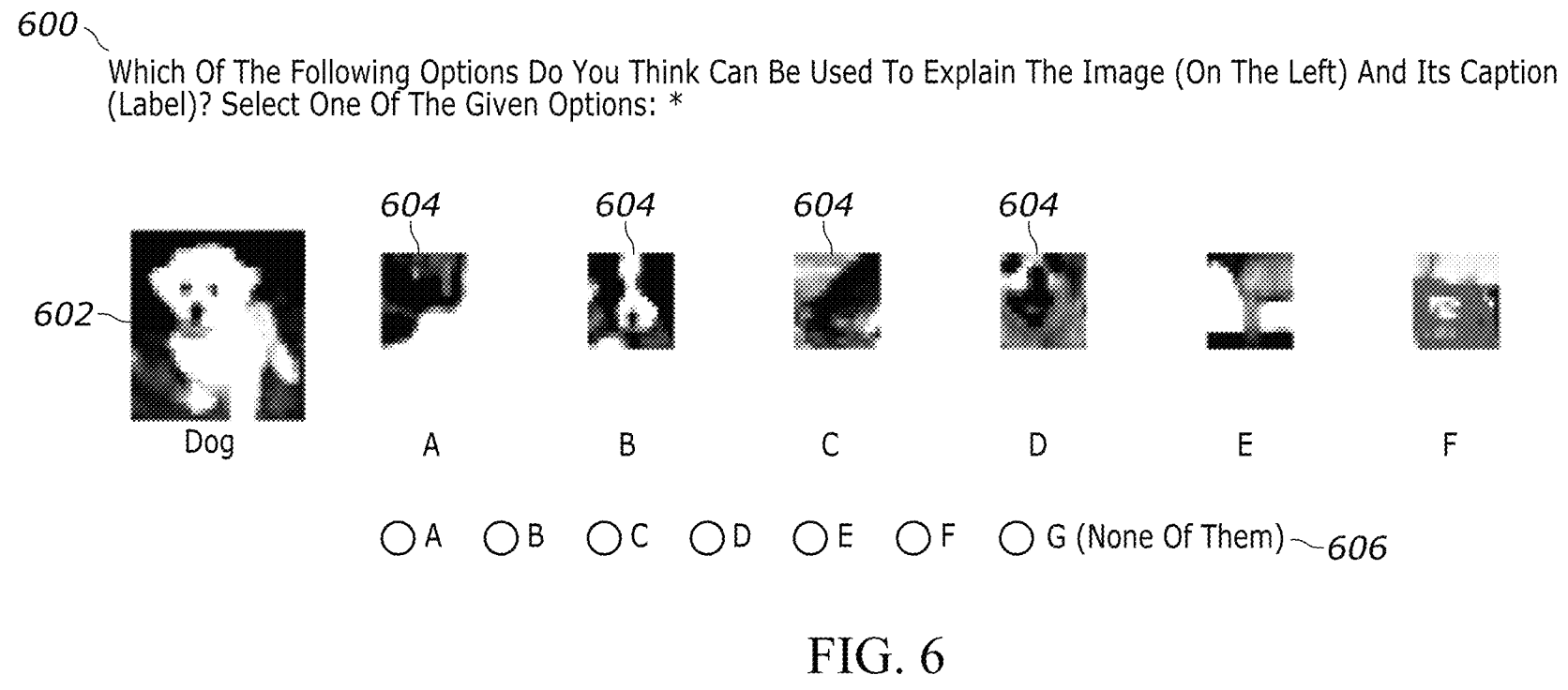

602 Dog

604 A 604 B 604 C 604 D E F

○ A ○ B ○ C ○ D ○ E ○ F ○ G (None Of Them) 606

FIG. 6

DEEP NEURAL NETWORKS VIA PROTOTYPE FACTORIZATION

CROSS-REFERENCE TO RELATED APPLICATIONS

This application claims the benefit of U.S. Provisional Application No. 63/108,192 filed Oct. 30, 2020, the entire disclosure of which is incorporated by reference herein.

TECHNICAL FIELD

This disclosure relates generally to systems and methods of image classification and operation based on the resulting classification.

BACKGROUND

Typical deep neural networks (DNNs) are complex black-box models and their decision making process can be difficult to comprehend even for experienced machine learning (ML) practitioners. Therefore their use could be limited in mission critical scenarios despite state-of-the-art performance on many challenging ML tasks. Further, in recent years deep neural networks (DNNs) are increasingly used in a variety of application domains for their state-of-the-art performance in many challenging machine learning tasks. However their lack of interpretability could cause trustability and fairness issues and also makes model diagnostics a difficult task.

SUMMARY

One embodiment may include a method to optimize a Deep Neural Network may include receiving a set of images, analyzing the images via a deep neural network, selecting an internal layer of the deep neural network, extracting neuron activations at the internal layer, factorizing the neuron activations via a matrix factorization algorithm to select prototypes and generate weights for each of the selected prototypes, replacing the neuron activations of the internal layer with the selected prototypes and the weights for the selected prototypes, receiving a second set of images, classifying the second set of images via the deep neural network using the selected prototypes and the weights for the selected prototypes, displaying the second set of images, the selected prototypes, and the weights for the selected prototypes, displaying predicted results and ground truth for the second set of images analyzed by the deep neural network, providing error images based on the predicted results and ground truth; identifying error prototypes of the selected prototypes associated with the error images; ranking error weights of the error prototypes of the error images, and outputting a new image class based on the error prototypes being one of a top ranked error weights.

BRIEF DESCRIPTION OF THE DRAWINGS

FIGS. 4A-4L are graphical representations of magnitude of time-series data in relation to time.

FIG. 6 is an illustration of an image with prototypes and sample questions.

DETAILED DESCRIPTION

Figure 1:
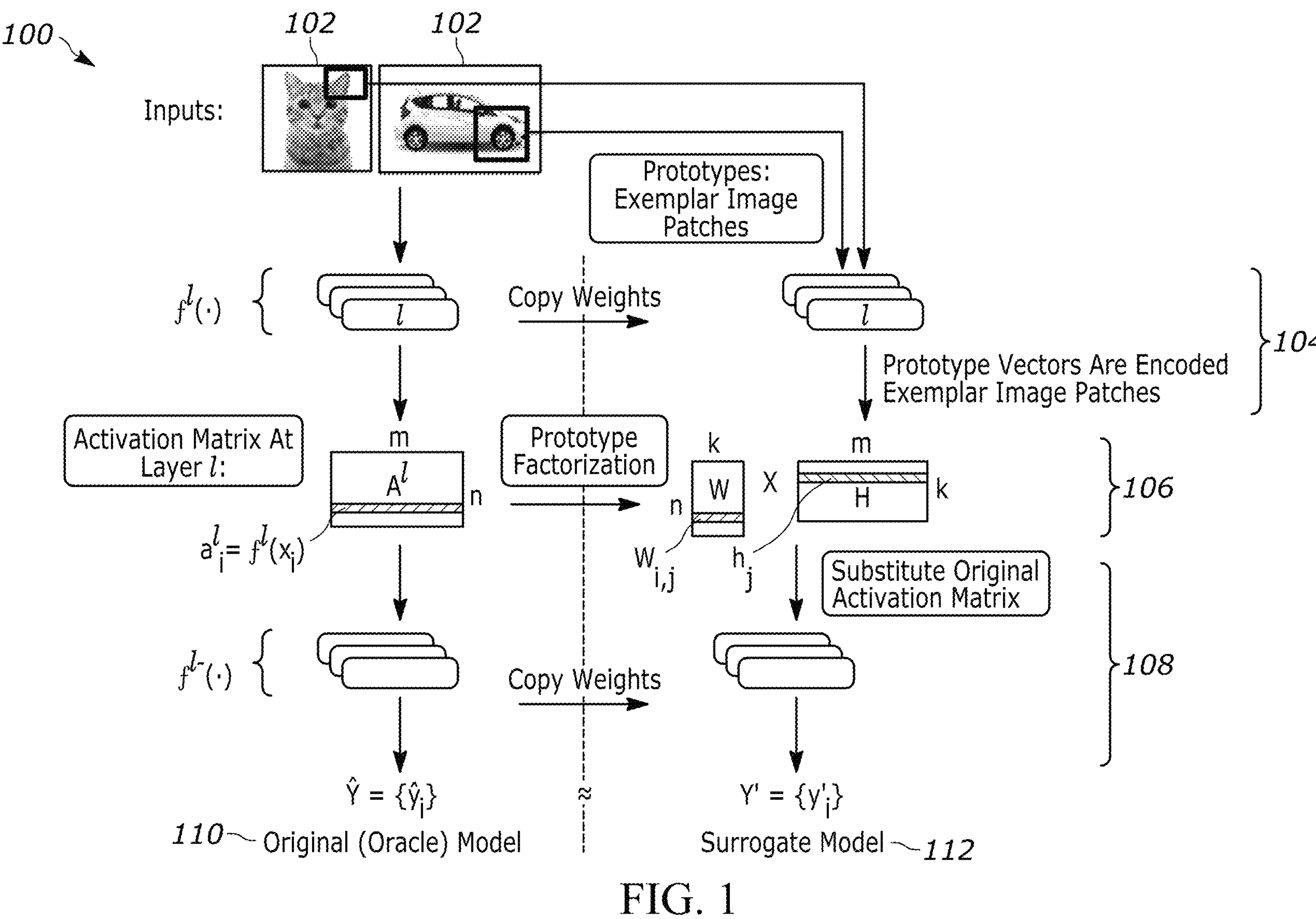
FIG. 1 illustrates a flow diagram of image classification via a Deep Neural Network and a surrogate model using a matrix factorization algorithm to factorize neuron activations.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

A system and method to empower users to interpret and optimize DNNs with a post-hoc analysis protocol is presented in this disclosure. An explainable matrix factorization technique (ProtoFac) that decomposes the latent representations at any selected layer in a pre-trained DNN as a collection of weighted prototypes, which are a small number of exemplars extracted from the original data (e.g. image patches, shapelets) is disclosed. Using the factorized weights and prototypes, a surrogate model for interpretation may be made by replacing the corresponding layer in the neural network. The system may identify a number of desired properties of ProtoFac including authenticity, interpretability, simplicity and propose the optimization objective and training procedure accordingly. The method is model-agnostic and can be applied to DNNs with varying architectures. It goes beyond per-sample feature-based explanation by providing prototypes as a condensed set of evidences used by the model for decision making. The system may apply ProtoFac to interpret pretrained DNNs for a variety of ML tasks including time series classification on electrocardiograms, and image classification. The result shows that ProtoFac is able to extract meaningful prototypes to explain the models' decisions while truthfully reflects the models' operation. The system may also evaluated human interpretability through Amazon Mechanical Turk (MTurk), showing that ProtoFac is able to produce interpretable and user-friendly explanations.

Although the images for this technique and system is illustrated as visual images and time series data, this method and system can also be applied to other time series data such as other time series signals such as voice, sound, pressure, flow, or other time series data that can present an image as a time series. Likewise, the input for this technique and system may include sensors such as a charge couple device (CCD), video, radar, LiDAR, ultrasonic, motion, microphone, strain gauge, thermal imaging, pressure, or other type of sensor.

Deep neural networks (DNNs) have shown promising results in various machine learning (ML) tasks including image, time-series and many others. However, given the complexity of their architecture and the high dimensional internal state, interpreting these models are extremely challenging. Lack of explanation of such models in many real world use cases, especially in high-stake mission critical situations in medicine, finance, etc. makes them less trustworthy or adaptable for use.

To address this challenge, a variety of methods have been developed to obtain post-hoc explanations of pre-trained black-box DNN models. With post-hoc explanation techniques, the system can get an improved understanding of a model without incurring changes to it and therefore risking lower prediction accuracy. Examples of such methods include calculating feature attribution or using interpretable surrogates (e.g. linear regression) to locally approximate a model's decision boundary. However, most of the techniques only provide per-instance or local explanations and it is difficult to gain an understanding of the model's behavior as a whole. To obtain global explanations of DNNs, existing methods interpret the representations captured by each neuron at intermediate layers with activation maximization methods or extract concepts highly correlated with model outputs. ML model developers can use these techniques for validation and debugging purposes.

In this disclosure the system may introduce ProtoFac, an explainable matrix Factorization technique that leverages Prototype learning to extract user-friendly explanations from the activation matrix at intermediate layers of DNNs. One goal may be to obtain a set of prototypes with a set of corresponding weights for each input to explain the behaviour of the model as a whole. Prototype learning is a form of case-based reasoning, where the model relies on previous examples similar to the present case to perform prediction or classification. It is a reasoning process used frequently in our everyday life. For example, a lawyer may cite an example from an old trial to explain the proceedings of the current trial and a doctor may rely on records of symptoms from past patients to perform diagnosis for new patients. While a number of DNNs already utilize prototype learning for built in interpretability, one goal may be to leverage the idea for post-hoc, global explanation of DNNs by using the factorized weights and prototype vectors to build an interpretation surrogate/surrogate model to mimic the original model's behaviour: reconstruct the activation matrix at the selected layer and feed it to the downstream network to reproduce the predictions of the original model.

The system may include a number of desired characteristics of the proposed technique (e.g., the desiderata):

Authenticity. A reliable and trustworthy explanation of a DNN should have high fidelity to the underlying model by faithfully representing the operations of the network. To this end, the method should not only mimic the underlying model's output but also accurately reconstruct the latent activation matrix in intermediate layers with weighted combinations of prototype vectors.

Interpretability. To obtain interpretable matrix factorization results, the technique should include non-negative constraints to ensure additive, not substractive combination of prototypes. Besides that, each prototype should correspond to a realistic example in the data to be human-understandable.

Simplicity. As the principle of Occam's Razor states, the simplest explanation should be adopted whenever possible. Here it means that the explanation of a model's prediction result should use the least possible number of prototypes.

Model-agnostic. Our goal is to develop a generic method that is applicable to DNNs with varying architectures so that it is flexible for models coming up in the future.

The system discloses a novel learning objective for matrix factorization considering the above criteria to obtain a set of prototypes and their corresponding weights for model interpretation. The training procedure uses gradient descent and iteratively projects the prototypes to realistic data samples or segments of data samples (e.g. image patches, n-grams and shapelets in time-series).

It may be beneficial to conduct experiments on a variety of pretrained DNNs for a wide range of ML tasks including time-series classification on electrocardiograms (ECG) and image classification, demonstrating the general applicability of the proposed method. For each experiment, the surrogate model's accuracy with respect to both the oracle prediction generated by the original model and the ground truth labels may be shown. To evaluate the transferability of the learned prototypes, the experiment may take a holdout dataset, freeze the prototypes learned previously, train the weights only and report the results. It may be beneficial to report case studies and visualize the prototypes identified by the algorithm. ProtoFac is further compared to non-negative matrix factorization techniques using Frobenious loss as a quality metric. Experiments show that this algorithm produces comparable and sometimes superior factorization results. To evaluate human intepretability of the results, it may be beneficial to conduct a crowd-sourced quantitative user study via Amazon Mechanical Turk (MTurk). In the study, the subjects may be asked to interpret the classification result of a given instance by selecting from a set of candidate prototypes. The result shows that ProtoFac is able to select prototypes that align well with user's intuition or common sense for model interpretation. It may also be beneficial to conduct various experiments to study the effects of the hyperparameter settings (e.g. the number of prototypes k) and the selection of different layers in a DNN. The description of results may be discussed below.

ProtoFac, an explainable matrix factorization technique that leverages prototype learning to obtain post-hoc, model-agnostic interpretations of trained DNNs. Experimental results on publicly available time-series, and image data showing that this technique faithfully reflects the behaviour of the original models and successfully retrieves meaningful prototypes to explain the model behaviour. Crowd-sourced quantitative user study with results showing the effectiveness of this technique in extracting human interpretable prototypes to explain complex DNNs.

This algorithm is designed to help make complex ML models interpretable. To achieve this, there are two main alternatives: (1) use inherently interpretable models, or (2) use post-hoc analysis methods to analyze trained DNN models to render them interpretable. Furthermore, past efforts in posthoc model interpretation can be categorised as local and global explanation techniques. Local explanation techniques show a model's reasoning process in relation to each data instance. Global explanation techniques aim to provide an understanding of the model's behaviour as whole and analyze what knowledge has been acquired after training.

Intrinsically interpretable models. Models such as decision trees, rule-based models, additive models, sparse linear models are considered inherently interpretable. Unlike DNNs, these models provide internal components that can be directly inspected and interpreted by the user, e.g. probing various branches in a decision tree, or visualizing feature weights in a linear model. Though these approaches provide insightful explanations of ML systems' reasoning process, inherently interpretable approaches usually rely on simpler models which may compromise prediction performance in comparison to state-of-the-art DNNs. Recently, a number of DNN architectures also incorporate interpretable components such as attention modules or prototype layers for intrinsic interpretability. However, such models may need to perform trade-off between interpretability and model performance in terms of prediction accuracy.

Post-hoc local explanation. Local explanation methods show a pre-trained model's reasoning process in relation to each data instance. One of the most popular post-hoc approaches to explain models is calculating and visualizing feature attributions. Feature attributions can be computed by slightly perturbing the input features for each instance to verify how the DNN model's prediction response varies accordingly. It can also be computed by backpropagating through the neural network. Another popular local explanation approach samples the feature space in the neighborhood of an instance to compose an additional training set. The training set is used to build an interpretable local surrogate model that mimics the behaviour of the original model. Using this approach an original model's prediction can be explained by an interpretable model (e.g. linear regression) that is easier to inspect. However, local explanation approaches are shown to be inconsistent as the explanation is true for only a specific data instance or its neighbors but not for all the items in the data. Furthermore, it could produce contrasting explanations for two data items from the same class label. It could also suffer from adversarial perturbations and confirmation biases. Besides that, post-hoc local explanation methods require users to manually inspect each data sample to review the model's behaviour instead of showing the model's behaviour as a whole.

Global explanation techniques aim at providing an overview of the model's behaviour instead of focusing on individual instances or local input regions. For DNNs, a particular set of global model explanation techniques focus on understanding the latent representations learned by the neural network through activation maximization techniques which calculate inputs that can maximally activate each individual neurons in intermediate layers in a neural network. On the other hand, concept-based explanations show how the model makes predictions globally by showing relevant concepts that are understandable to humans. For example, the technique interpretable basis decomposition (IBD) explains image classification model by showing relevant concepts that are human-interpretable. In particular, concept activation vectors (CAV) are discussed by Kim et al. as a framework to interpret latent representations in DNNs. This technique has been shown to be implemented by using supervised approaches where data with human-annotated concepts is available, or by unsupervised techniques (i.e. clustering) to retrieve relevant concepts directly from the training data.

Our approach simplifies and visualises the otherwise complex representation of a latent space of any layer of a DNN. The system may factorize a desired layers' activation matrix to find k prototypes and their respective weights for each input instance. Using this post-hoc analysis protocol the system may probe an existing model and explain its reasoning process. The system may design our approach to be model and data agnostic by being able to work with a variety of DNN architectures for image, time-series, and text data analysis.

FIG. 1. ProtoFac uses a surrogate model that replaces the activation matrix $A^l$ at any selected layer l in a neural network with weighted combinations of prototypes (i.e. W×H). To authentically reflect the model operation the goal is to reconstruct the activation matrix with minimum uninterpreted residuals (i.e. $kA^l - W\times Hk_F$) and mimic the original models' prediction as much as possible. For better interpretability, the system may constrain the prototype vectors $h_j$ in H to be the latent representations of realistic data samples or segments of data samples at layer l.

FIG. 1 illustrates a flow diagram of image classification 100 via a Deep Neural Network 110 and a surrogate model 112 that uses a matrix factorization algorithm to factorize neuron activations. Input data 102 is received by a controller, the input data 102 may be text data (e.g., the corresponding prototypes are n-grams), image data (e.g., the corresponding prototypes are image patches), or time-series data (the corresponding prototypes are shapelets or wavelets).

In step 104, the controller feeds the input (e.g. images, text, time-series) to the neural network till a selected layer l.

In step 106, the controller obtains the neuron activation matrix at layer l and factorize the neuron activation matrix to obtain a set of prototype vectors and their associated weights.

In step 108, the controller feeds the neuron activations into the downstream layers after 1 in the oracle model and the reconstructed neuron activations from weighted prototypes in the surrogate model.

More specifically, as illustrated in FIG. 1, the system may include ProtoFac to build a surrogate model to explain the original DNN's activation matrix at any user-specified layer l, which denotes as $A^l$. Assuming the latent representation at layer l is a fixed length vector with m dimensions and the total number of input instances is n, $A^l$ will be a n×m matrix where each row $$a_i^l \in \mathbb{R}^m$$

represents the latent activation of input instance $x_i$ at layer l. ProtoFac decomposes $A^l$ to obtain $$A^l_{n\times m} \approx W_{n\times k} \cdot H_{k\times m},$$

where k is the number of prototypes, a hyperparameter that needs to be specified. Each row $h_j \in R^m$ in $H_{k\times m}$ is a prototype vector and each row $w_i \in R^k$ in $W_{n\times k}$ is a weight vector to combine the k prototypes and recover the original activation vector $$a_i^l \text{ of } x_i.$$

For the prototype vectors $h_j$ (0≤j<k) to be interpretable, in ProtoFac the system may constrain them to be the latent representations of realistic data samples or segments of data samples at layer l, e.g., image patches, shapelets (i.e. segments in time-series) or n-grams in text data.

In FIG. 1, $f^{l-}(\bullet)$ represents the downstream part in the original network after layer l and $f^l(\bullet)$ represents the upstream part that takes any input $x_i$ and output the latent representation $a_i^l$ $$_i^l = f^l(x_i)$$

at layer l. Using the original latent representation at layer l, the prediction for $x_i$ is $y\hat{}_i$, which may also be referred to as the oracle prediction. The surrogate model uses the recovered activation W×H as input to the downstream layers after l to obtain a new set of predictions for $\{x_i\}$ which should highly resemble the original model's oracle predictions.

Optimization Objective: The optimization objective may be based on the desiderata listed above for post-hoc explanation of DNNs.

Authenticity. ProtoFac replaces the original model's activation matrix with the recovered activation matrix obtained through the weighted combination of prototype vectors and feeds it to the downstream network. This step may produce similar prediction compared to the original network. To faithfully reflect the original model's behavior, the following two loss terms are defined:

Frobenius norm of the factorization residual:

$$L_T(W, H)\,|_{X,f,l} = \frac{1}{n}\|R\|_F = \frac{1}{n}\|A^l - W\times H\|_F \tag{1}$$

where $X=\{x_i\}$,0≤i<n represents all the input instances, f is the trained oracle model and l is the selected factorization layer. The goal is to minimize uninterpreted residuals if replaced the original activation matrix with the weighted combination of prototypes at layer l.

Cross entropy loss comparing oracle model's and the interpretation surrogate's predictions, using binary classification as an example:

$$L_{ce}(W, H) = -\frac{1}{n}\sum_{0\le i<n} \hat{y}_i \log(p'(\hat{y}_i)) + (1-\hat{y}_i)\log(1-p'(\hat{y}_i)) \tag{2}$$

where $y\hat{}_i$ is the oracle prediction on the input instance $x_i$, and $p^0(y\hat{}_i)$ is the surrogate model's predicted probability on the oracle label, obtained by feeding reconstructed activation down through $f^{l-}(\bullet)$.

Non-negativity. The system may find matrix W with only non-negative entries to allow only additive combinations of prototypes. Each row in W may be summed to 1.0 such that the weights of the prototypes can be directly compared among different input instances.

Sparsity and concentration may be a factor of such a system and a method. To ensure that users are not overwhelmed by the shown prototypes, the system may seek to find less but good prototypes that can reconstruct the activation matrix precisely. To encourage that the distribution of the weight to be concentrated at only a few prototypes for each input, the system may add a concentration loss term:

$$L_c(W) = \frac{1}{n}\sum_{0\le i<n} \min_{0\le j<k} \|w_i - e_j\|^2 \tag{3}$$

where $e_j$s are standard basis vectors with length k. Only the jth entry in $e_j$ is equal to 1.0 and all the others are equal to zero. The loss function encourages the weights to concentrate on any one prototype. Notice that this is a soft-constraint and does not enforce a strict clustering boundary as k-means does.

Full objective. The system may combine the above discussed loss terms and constraints together to form the following optimization objective:

$$\text{Loss}(W, H)|_{x,f,1} = \lambda_{ce} L_{ce}(W, H)|_{x,f,1} + \lambda_r L_r(W, H)|_{x,f,1} + \lambda_c L_c(W) \tag{4}$$

where $W\in R^{n\times k}$, $H\in R^{k\times m}$, W≥0, H≥0 and P0≤j<k wi,j=1.0.

Introduction of the ProtoFac algorithm: With the additional loss terms in the optimization objective matrix factorization techniques e.g. alternating least squares (ALS) is no longer sufficient. The optimization objective is not convex with respect to W or H due to the addition of the authenticity term involving the downstream layers $f^{l-}(\bullet)$ in the deep neural network. Therefore the system may utilize, in one embodiment, an algorithm using stochastic gradient descent (SGD) with mini-batch to obtain the prototypes and their respective weights. A mini-batch is a small subset of the original image set, for example, if the original image set is 10,000 images, a mini-batch could be 200 images providing 50 batches. The predefined threshold is obtained to meet the system memory constraints.

The ProtoFac algorithm is shown in detail in Algorithm 1. It first collects the activation matrix $A^l$ and the oracle predictions $Y=\{y^{\hat{}i}\}$(0≤i<n) by feeding the training data $X=\{x_i\}$ into the original DNN (line 1-2).

The activation matrix is constructed by flattening the latent activation of each input at layer l and concatenate them to form an n×m matrix. After that, a set of candidate prototypes are generated by first randomly sampling a subset of X and then applying g(•) to each sample $x_i \in$ sampler(X) to generate a set of candidate prototypes. g(•) varies for different types of data but generally it can be implemented by applying a sliding window over e.g. image or time-series data to obtain a set of image patches or shapelets respectively. The system may collect all the candidate prototypes $P=\cup_{x_i \in sampler(X)} g(x_i)$ as well as their latent representations at layer l, which are collectively denoted as $A^l_P$ line 3-4 For DNNs that accept varying lengths inputs, the candidate prototypes are directly fed into the network to obtain the latent representation. For DNNs with fixed size inputs the system mayf simply mask the data outside the region covered by the moving window.

Algorithm 1: The ProtoFac algorithm.

```
Input: pretrained model f,selected layer l, training
        data X = {x_i}, candidate prototype generator
        g(x_i)
Parameters: number of prototypes k, hyperparameters
        (λs)
Output: prototype vector H, weight matrix W
/ *  Obtain activation matrix and
      oracle labels                                         */
A^l = [a_i], a_i = f^l(x_i), x_i ∈ X;
Ŷ = {ŷ_s =f(x_i)}, x_i ∈ X;
/ *  Obtain candidate prototypes and
      their latent activations                              */
P = ∪_{x_i∈sampler(X)} g(x_i);

A^l_P = [a_p], a_p = f^l(p), p ∈ P;

/ *  Freeze up and downstream network
      in oracle model                                       */
freeze_parameter(θ) for θ in f^l(·) and f^{l-}(·);
for epoch ∈ [1, n_epochs] do
 |   for batch ∈ batch_generator(A^l.rows) do
 |   |     batch_loss = loss(W[batch.rows], H);
 |   |     update (W[batch.rows] and H with gradient
 |   |      descent;
 |   end
 |   if mod(epoch, projection_interval) = 0 then
 |   |     /* project to candidate
 |   |            prototypes                                */
 |   |     H = [h_j] where h_j = f^l(p_j),
 |   |     p_j = argmin_{p∈P}||h_j − f^l(p)||^2;
 |   |     /* freeze H and update W                         */
 |   |     for epoch' ∈ [1, n_epochs'] do
 |   |      |     for batch ∈ batch_generator(A^l.rows) do
 |   |      |      |     batch_loss = loss(W[batch.rows], H);
 |   |      |      |     update W[batch.rows] with gradient
 |   |      |      |      descent;
 |   |      |     end
 |   |     end
end
```

Before the training starts, the system may freeze the parameters in both the upstream and downstream layers (line 5) since it may be beneficial to keep the oracle model intact. During training, W and H are initialized with random weights and updated through SGD (Adam optimizer is used in the experiments presented in this paper). The system can combine rows in $A^l$ to form training batches (line 7) to handle large scale data. When iterating through each batch the corresponding rows in W and the entire H will be updated through gradient descent (line 8-9) For every few epochs and also after the last epoch, the system may perform prototype projection (line 11-18) which first assigns the prototype vectors $h_j$ obtained through gradient descent to their nearest neighbors in P in euclidean distance (line 12).

The respective image patches, shapelets and n-grams are stored accordingly to generate user-friendly explanations along with the weights. After projection the algorithm freezes the prototype vectors and updates the weights again through SGD (line 13-18) to obtain an optimal factorization. The training process stops when the accuracy of the surrogate model with respect to the oracle prediction no longer improves. With ProtoFac described in Algorithm 1, the system can obtain a set of prototypes and their corresponding weights for a training set. To evaluate the applicability of the identified prototypes to unseen data, the system can use a similar algorithm except that now the prototype matrix H need to be freezed and the algorithm no longer performs prototype projection. A new W matrix is obtained for the unseen data however the same prototypes are used as for the training set.

Explain below are experimental results on a variety of DNNs for different ML tasks. All the experiments are conducted on publicly available datasets including image, time-series, and text data. Various ablation studies to examine how different hyperparameter settings, and the selection of different factorization layers in a model affects the surrogate model's accuracy may also be explained. A user study to evaluate human interpretability of the factorized prototypes is also explained.

The studies may include a system that implement the DNN models and ProtoFac using PyTorch. The system may utilize trained oracle models and save their internal parameters. The latent activations at the selected layer are collected through implementing a hook function in PyTorch and running the training samples through the network. In the same way, the system may collect the latent activations of the prototype candidates. When training the surrogate model all the downstream layer parameters in the oracle model are freezed.

Case Study: Interpret Image Classifiers: VGG and ResNet

The system may apply ProtoFac to analyze two models for image classification: VGG19 (+batchnorm) and ResNet50. Both models are trained on the CIFAR-10 dataset, which contains 60000 colored images evenly distributed in 10 classes. Each image has a resolution of 32×32. The models have more than 94% validation accuracy.

The system may select two layers each from VGG19 and ResNet50 for the experiment (Table I). The feature map of the selected layer is flattened to collect the activation matrix. In the surrogate model, after obtaining the reconstructed activation the system may also reshape it accordingly in order to send it to the downstream network. The prototype candidates are image patches generated from the training samples with a moving window of size 16×16 and a stride of 4. Therefore for each image 5×5 image patches are created. Experimentation with image patches of size 4×4, 8×8 was conducted, 16×16 respectively and found 16×16 gives the best results in terms of the authenticity with respect to the original model. To limit the number of patches, the system may have uniformly sampled 20% images for each class. For all the experiments with different layer and model combinations, the system may train the surrogate model using batch size of 64 and a learning rate of 0.005. In total for each experiment, the system may run 40 training epochs with a projection frequency of 5 and report the best result (in terms of accuracy wrp. the oracle model) obtained in the training process.

TABLE I

EXPERIMENTAL RESULTS ON VGG AND RESNET FOR IMAGE CLASSIFICATION TASKS.

| Dataset | Model | Acc. (valid) | Factorized Layer | k | Acc. (vs. oracle) | Acc. (vs. groundtruth) | F-loss (ProtoFac) | F-loss (NMF) |
|---|---|---|---|---|---|---|---|---|
| CIFAR-10 | VGG19 | 94.25 | maxpool3 | 60 | 96.10% | 90.65% | 0.0006 | 0.0009 |
| | | | maxpool3 | 120 | 98.45% | 92.80% | 0.0006 | 0.0009 |
| | | | maxpool5 | 60 | 100.00% | 93.60% | 0.0014 | 0.0243 |
| | ResNet50 | 94.38 | bottleneck14 | 60 | 98.35% | 94.15% | 0.0006 | 0.0056 |
| | | | bottleneck14 | 120 | 99.15% | 94.30% | 0.0007 | 0.0056 |
| | | | bottleneck16 | 60 | 99.65% | 94.35% | 0.0007 | 0.0197 |

TABLE II

EXPERIMENTAL RESULTS ON RESNET-1D FOR TIME-SERIES CLASSIFICATION TASK ON THE MIT-BIH DATA.

| Dataset | Model | Acc. (valid) | Factorized Layer | k | Acc.(vs. oracle) | Acc.(vs. groundtruth) | F-loss (ProtoFac) | F-loss (NMF) |
|---|---|---|---|---|---|---|---|---|
| MIT-BIH | ResNet-1D | 98.23 | block1 | 60 | 95.10% | 81.21% | 1.812 | 1.9113 |
| | | | block2 | 50 | 97.63% | 95.94% | 1.072 | 1.123 |
| | | | block3 | 50 | 98.21% | 97.27% | 0.873 | 0.943 |
| | | | fc | 50 | 100.00% | 98.34% | 0.0402 | 0.0654 |

In Table I, the system may set $\lambda_{ce}$=1.5, $\Delta_r$=50.0, and $\Delta_c$=10.0. Other training configs are: n epochs=50, batch size=64, projection interval=10, learning rate=0.005, n_epochs'=20, and learning_rate weight updates=0.005.

Table I summarizes the experimental results. The result shows that the surrogate model can achieve high fidelity to the original model—the accuracy of the surrogate models with respect to the oracle models' predictions (Acc. (vs. oracle) in Table I) remains high around 99% with appropriate setting of prototype number k. Correspondingly, the surrogate models also has similar accuracy as the oracle model with respect to ground truth labels (Acc. (vs. groundtruth) in Table I). The Frobenius losses (F-loss (ProtoFac) in Table I) remain reasonably close and sometimes is even lower compared to the one obtained through a classic non-negative matrix factorization algorithm, (F-loss (NMF)). Comparing the layer maxpool3 and maxpool5 results for VGG19 with equal k, it may be observed that by factorizing the layer closer to the output the algorithm can achieve higher fidelity to the oracle model, which is not too surprising. In FIG. 5 illustrates more extensive experiment to analyze how the selection of different k and layers in the original model would affect the performance of the surrogate model.

In FIG. 5, for the experiment on VGG19, the system may set Ace=1.5, Ar=50.0 and $\lambda_c$=10.0. Other training configs are: n_epochs=39, batch size=64, projection interval=5, projection interval=0.005, n_epochs'=20 and learning_rate_weight_updates=0.005.

FIGS. 2A-2L shows some example prototypes along with their weights from the factorization results to explain the original model's prediction. The result shown in the figure is obtained by factorizing the maxpool3 (FIG. 8B) layer in VGG19. It clearly shows that some predictions are performed by using a parts-based representation: on the first row the image is classified as a car since it is related to prototypes containing the wheel and the red taillight and the car back individually. FIGS. 3A-3L shows some example prototypes from different classes and the image samples with the highest weights on those prototypes.

FIG. 2. Example image patches and the highest weighted prototypes. The first row shows the prototypes associated with a car image: one prototype contains the wheel and another contains the red light which could be associated with the tail lamp. On the second row the horse is recognized by its body shape as the highest weighted prototypes all describe body shapes.

Figures 2A, 2B, 2C, 2D, 2E, 2F, 2G, 2H, 2I, 2J, 2K, 2L:
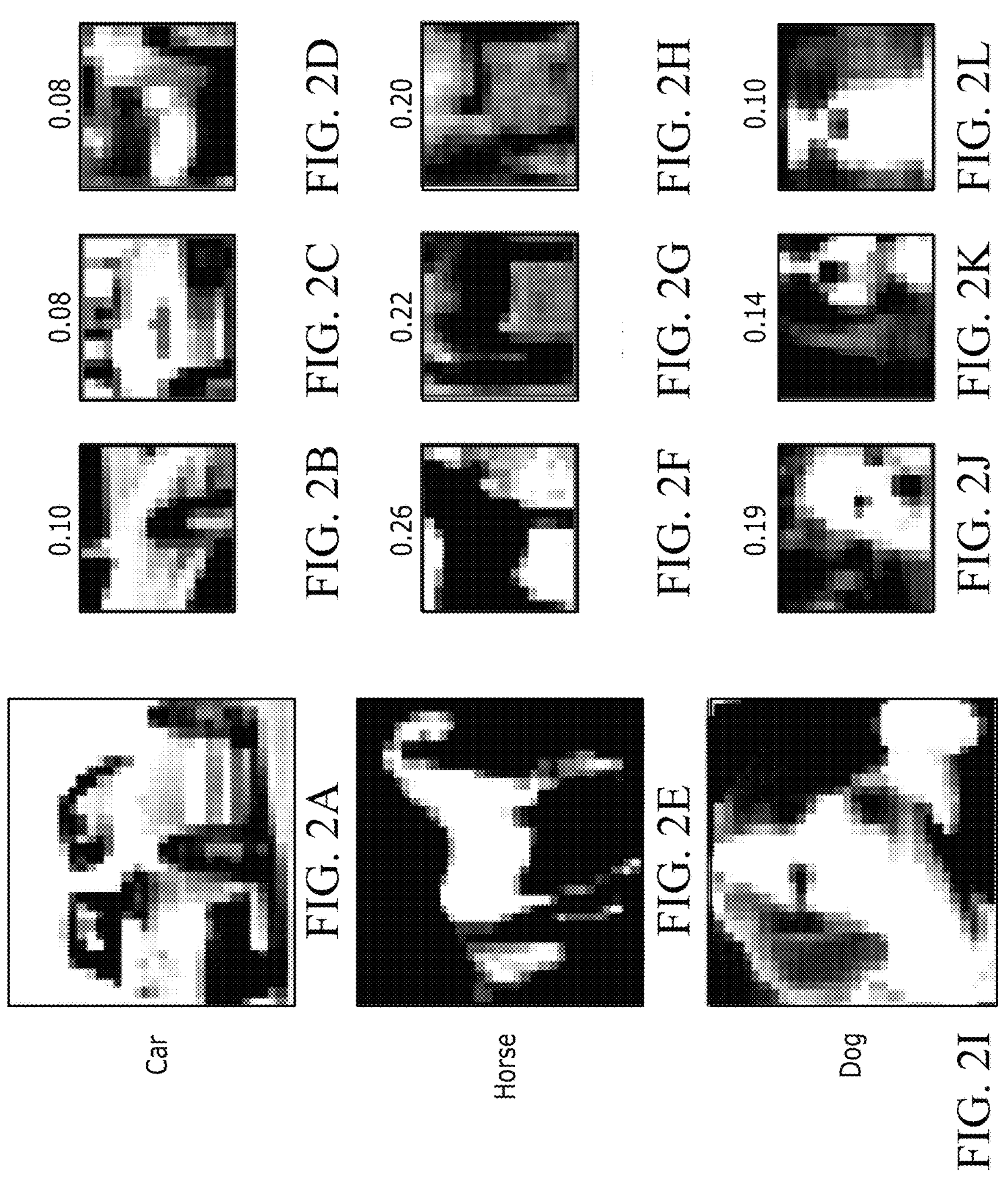
FIGS. 2A-2L are illustrations of image patches and the highest weighted prototypes of the images patches.

FIGS. 2A-2L are illustrations of image patches and the highest weighted prototypes of the images patches. FIG. 2A is an exemplary source image, FIG. 2B is prototype image with a weight of 0.10 with respect to the exemplary source image FIG. 2A, FIG. 2C is prototype image with a weight of 0.08 with respect to the exemplary source image FIG. 2A, FIG. 2D is prototype image with a weight of 0.08 with respect to the exemplary source image FIG. 2A, FIG. 2E is an exemplary source image, FIG. 2F is prototype image with a weight of 0.26 with respect to the exemplary source image FIG. 2E, FIG. 2G is prototype image with a weight of 0.22 with respect to the exemplary source image FIG. 2E, FIG. 2H is prototype image with a weight of 0.20 with respect to the exemplary source image FIG. 2E.

FIG. 2I is an exemplary source image, FIG. 2J is prototype image with a weight of 0.19 with respect to the exemplary source image FIG. 2I, FIG. 2K is prototype image with a weight of 0.14 with respect to the exemplary source image FIG. 2I, FIG. 2L is prototype image with a weight of 0.10 with respect to the exemplary source image FIG. 2I.

FIG. 3. Example prototypes (highlighted in their source images) and images with heavy weights on those prototypes. On the second row both birds and airplanes are matched to the same prototype for their similar wing shapes.

Figures 3A, 3B, 3C, 3D, 3E, 3F, 3G, 3H, 3I, 3J, 3K, 3L:
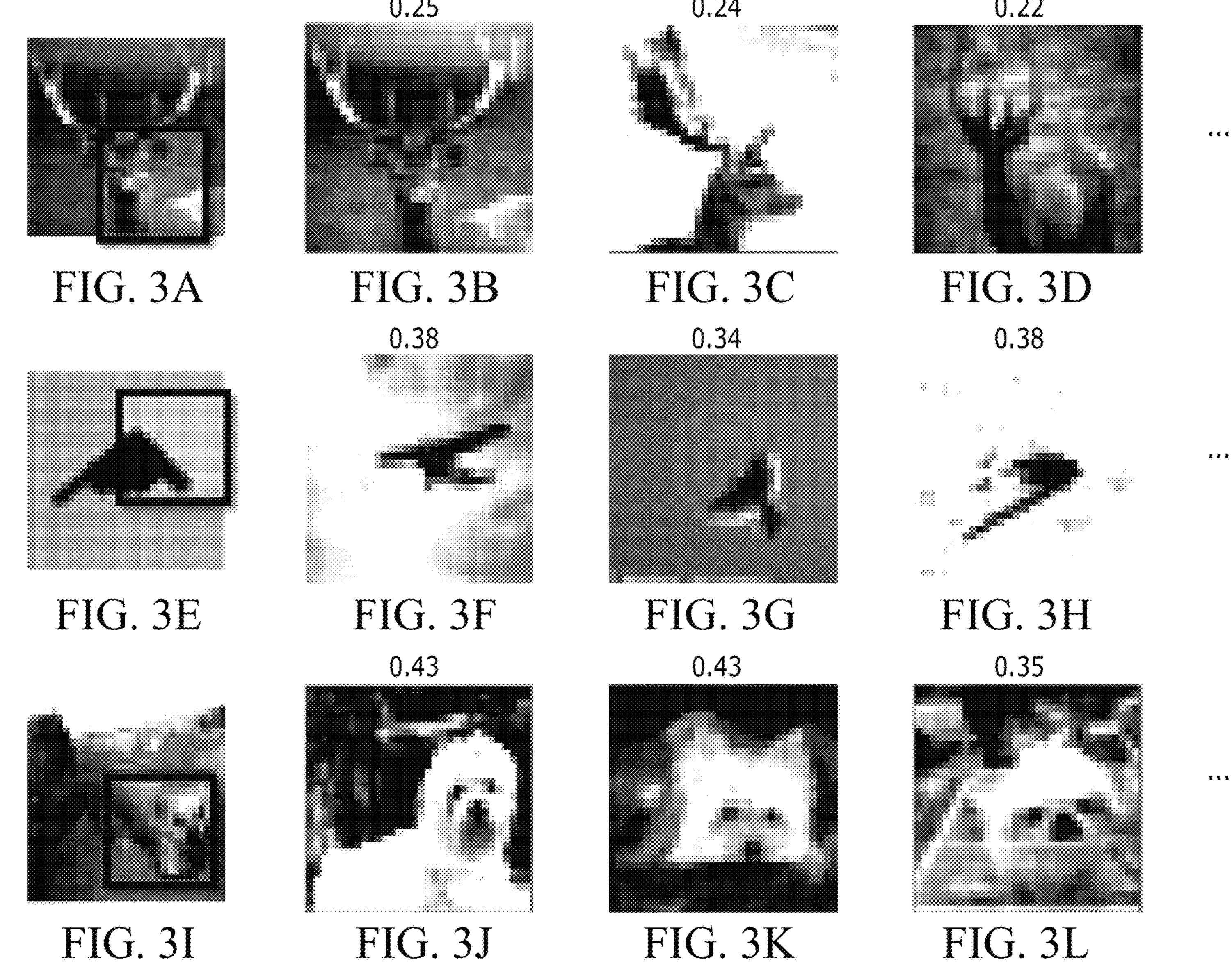
FIGS. 3A-3L are illustrations of prototypes highlighted within a source image example images with high weights on the prototype.

FIGS. 3A-3L are illustrations of prototypes highlighted within a source image example and images with high weights on the prototype. FIG. 3A is an exemplary source image with a prototype highlighted within the source image, FIG. 3B is a patch image with a weight of 0.25 with respect to the exemplary source image prototype FIG. 3A, FIG. 3C is a patch image with a weight of 0.24 with respect to the exemplary source image prototype FIG. 3A, FIG. 3D is a patch image with a weight of 0.22 with respect to the exemplary source image prototype FIG. 3A.

FIG. 3E is an exemplary source image with a prototype highlighted within the source image, FIG. 3F is a patch image with a weight of 0.38 with respect to the exemplary source image prototype FIG. 3E, FIG. 3G is a patch image with a weight of 0.34 with respect to the exemplary source image prototype FIG. 3E, FIG. 3H is a patch image with a weight of 0.38 with respect to the exemplary source image prototype FIG. 3E.

FIG. 3I is an exemplary source image with a prototype highlighted within the source image, FIG. 3J is a patch image with a weight of 0.43 with respect to the exemplary source image prototype FIG. 3I, FIG. 3K is a patch image with a weight of 0.43 with respect to the exemplary source image prototype FIG. 3I, FIG. 3L is a patch image with a weight of 0.35 with respect to the exemplary source image prototype FIG. 3I.

Case Study: Interpret Time Series Classifiers for ECG Data. Electrocardiogram (ECG) records are widely utilized by medical practitioners to monitor patients' cardiovascular health and perform diagnosis. Since manual analysis of ECG signals is both time-consuming and error-prone, recently a number of studies explore using machine learning to automatically perform anomaly detection or classification on ECG signals.

Among the ML models DNNs is one of the most widely used. It may be beneficial to test such a technique on a DNN model to classify ECG signals, using the MIT-BIH Arrhythmia ECG Databases with labeled records. The dataset contains ECG recordings from 47 subjects each recorded at a sampling rate of 360 Hz.

TABLE III

EXPERIMENTAL RESULTS ON CNN-1D MODEL FOR ECG TIME-SERIES CLASSIFICATION.

| Dataset | Model | Acc. (valid) | Factor. Layer | k | Acc. (v. oracle) |
|---|---|---|---|---|---|
| MIT-BIH | CNN | 98.11% | fc1 | 50 | 99.76% |
| | | | fc2 | 50 | 100.00% |

| cont. | Acc. (v. groundtruth) | F-loss (ProtoFac) | F-Toss (NMF) |
|---|---|---|---|
| | 97.76% | 0.0132 | 0.0231 |
| | 98.09% | 0.0651 | 0.0320 |

In Table III, for the experiment on the CNN model for electro-cardio-diagram (ECG) classification, the system may set $\lambda_{ce}$=30.0, $\lambda_{r}$=15.0 and $\lambda_{c}$=1.0. Other training configurations are: k=50, n epochs=120, batch size=4096, projection_interval=30, learning rate=0.09, n epochs$^{0}$=20, and learning rate weight updates=0.005.

The system may use preprocessed data from where each segment corresponds to a heartbeat. In accordance with Association for the Advancement of Medical Instrumentation (AAMI) EC57 standard, each of the segments are annotated with one of the 5 labels: Normal (N), Supraventricular Ectopic Beat (SVEB), Ventricular Ectopic Beat (VEB), Fusion Beat (F), and Unknown Beat (Q). Furthermore the data is divided into training and validation set with 87 k samples and 21 k samples, respectively. Since the ECG data is a uni-variate time series, the system utilized a 1D CNN model. (architecture diagram in Appendix VI-B). The system may train the CNN-1D model with convolutional kernels of size 4, 8, 16, 32, 64 and 128 channels each, a max pooling (over time) layer, and 2 fully connected layers following that. The model is trained with batch size of 4096. With 120 epochs, the system may obtain an original model with 99.37% and 98.11% training and validation accuracy (Table III).

For the experiments on ECG data, the system may use complete heartbeat sequences as candidate prototypes and do not apply moving window on top of it to extract time series segments as prototypes. The reason is that the original sequences only contain individual heartbeats and further dividing them could hurt interpretability. The system may train the surrogate model using k=50 with 120 epochs and a projection frequency of 30. The system may factorize the output from the two layers just before fc1 and fc2 and find that our surrogate model is able to obtain high fidelity with respect to the original model (Table III Acc. (vs. oracle)) at both layers. The activation matrix is also reconstructed with reasonable Frobenious losses (Table III F-loss (ProtoFac)) when compared to traditional NMF technique (Table III F-loss (NMF)).

FIG. 4. Recovered prototypes for ECG data. Each class is represented with a separate color. The solid line is the prototype while the transparent lines are inputs with the highest weight on the corresponding prototypes.

Figure 4A:
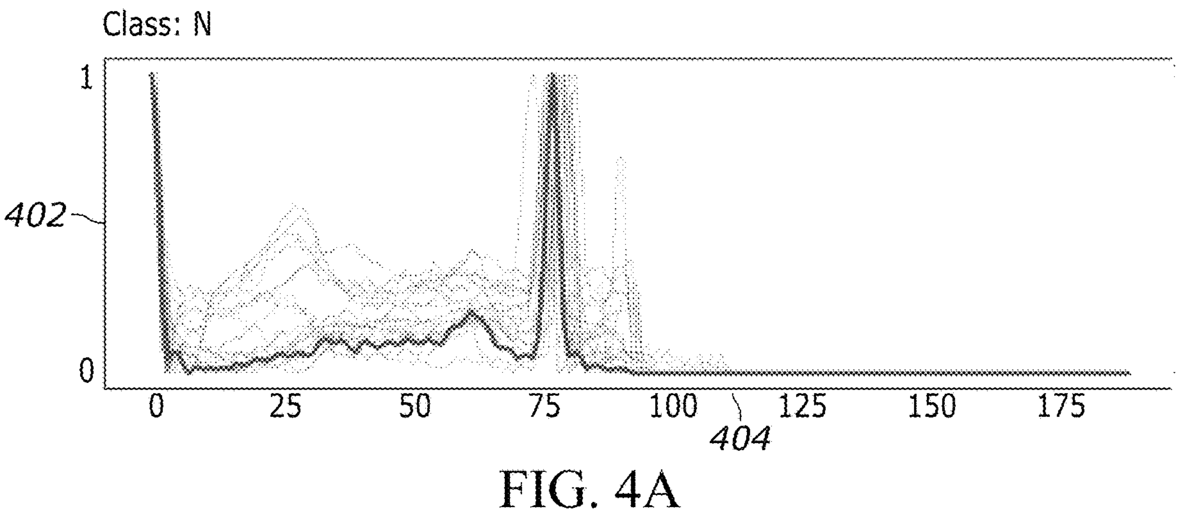
Figure 4B:
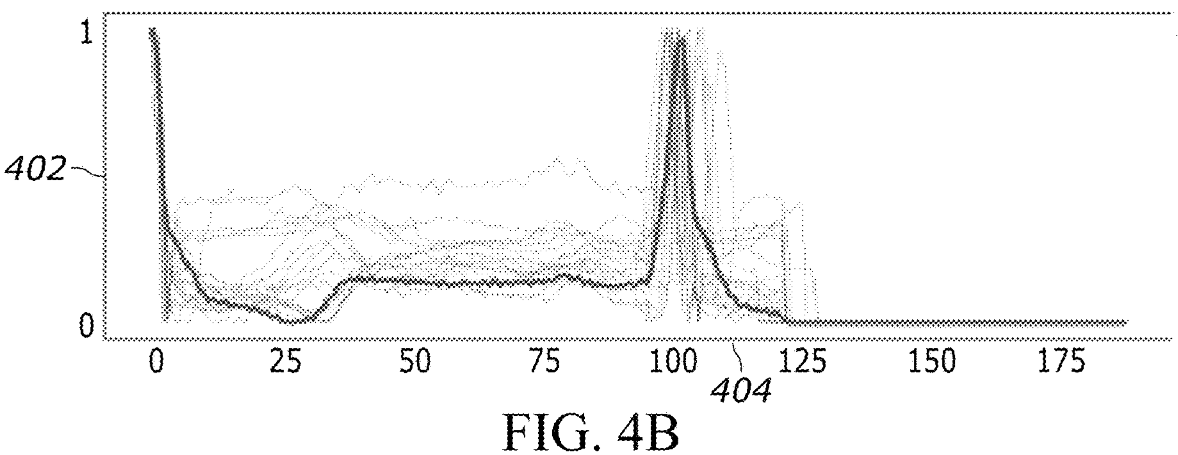
Figure 4C:
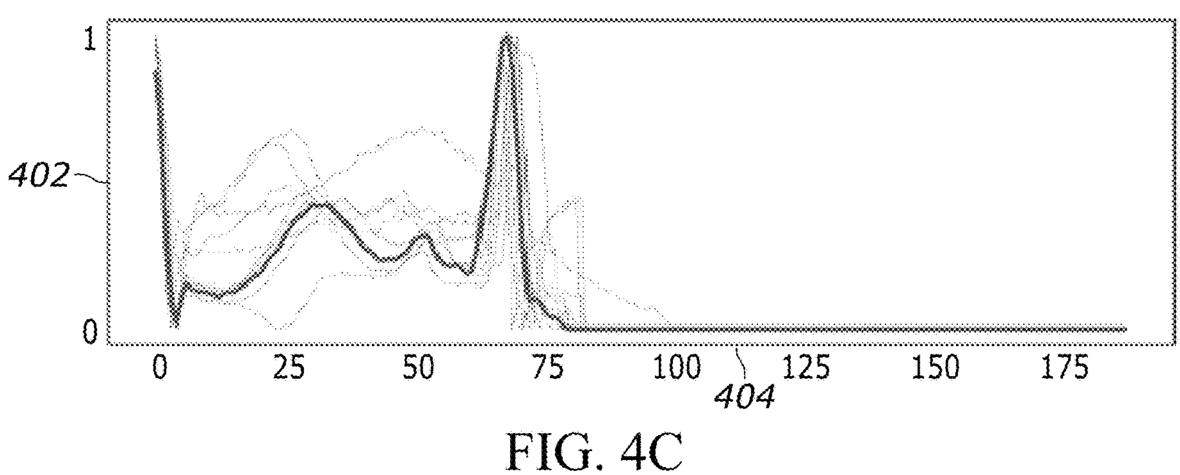

FIG. 4A is a graphical representations of magnitude 402 of time-series data (e.g., ECG data sample) in relation to time 404. Here the heartbeat is a normal (Class N) rhythm in which the solid line is the prototype while the dotted lines are inputs with top ranked weights for the corresponding prototypes. FIG. 4B is a graphical representations of magnitude 402 of time-series data (e.g., ECG data sample) in relation to time 404. Here the heartbeat is a normal (Class N) rhythm in which the solid line is the prototype while the dotted lines are inputs with top ranked weights for the corresponding prototypes. FIG. 4C is a graphical representations of magnitude 402 of time-series data (e.g., ECG data sample) in relation to time 404. Here the heartbeat is a normal (Class N) rhythm in which the solid line is the prototype while the dotted lines are inputs with top ranked weights for the corresponding prototypes.

Figure 4D:
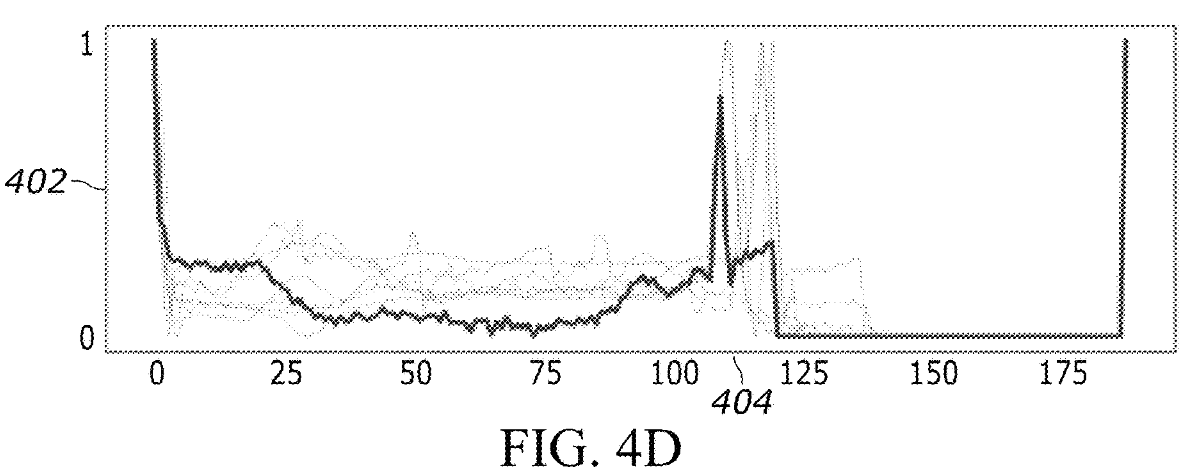
Figure 4E:
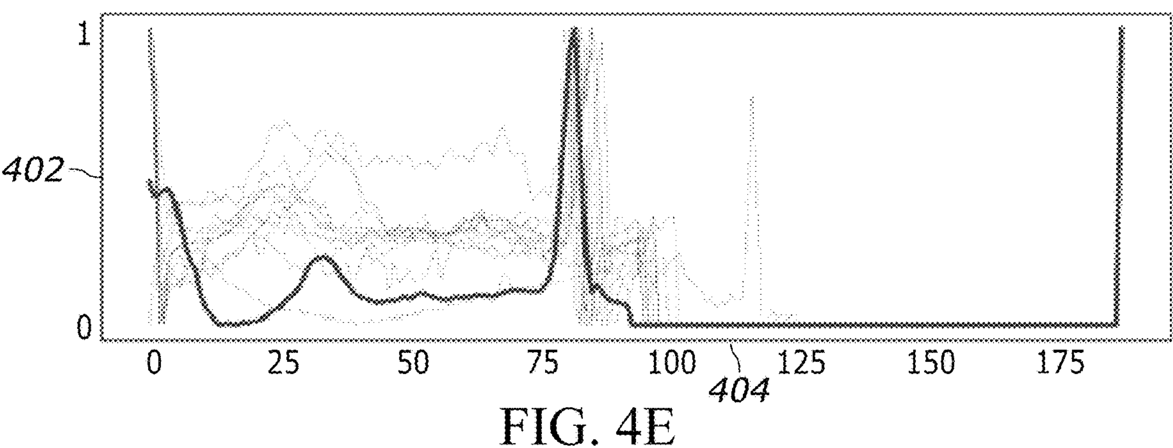
Figure 4F:
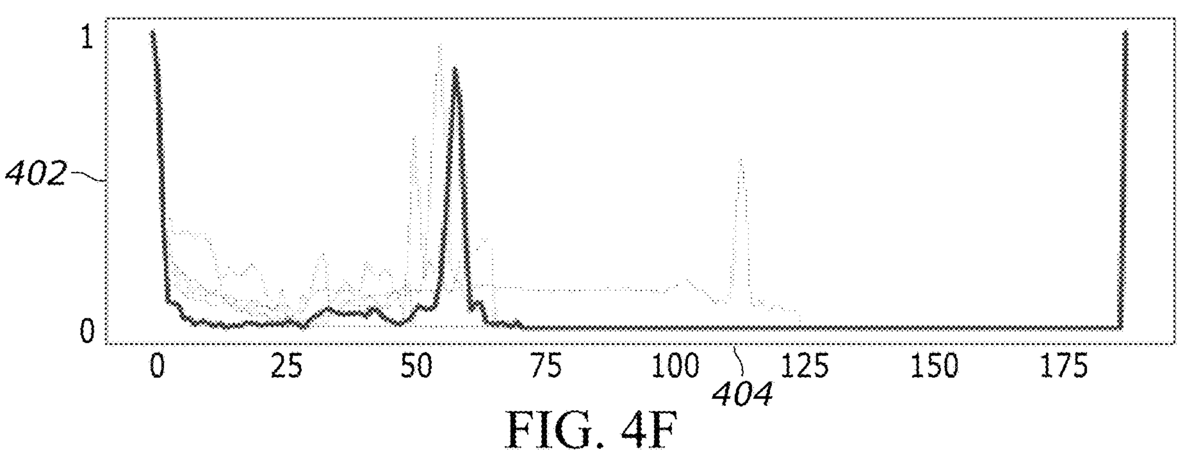

FIG. 4D is a graphical representations of magnitude 402 of time-series data (e.g., ECG data sample) in relation to time 404. Here the heartbeat is a supraventricular (Class SVEB) rhythm in which the solid line is the prototype while the dotted lines are inputs with top ranked weights for the corresponding prototypes. FIG. 4E is a graphical representations of magnitude 402 of time-series data (e.g., ECG data sample) in relation to time 404. Here the heartbeat is a supraventricular (Class SVEB) rhythm in which the solid line is the prototype while the dotted lines are inputs with top ranked weights for the corresponding prototypes. FIG. 4F is a graphical representations of magnitude 402 of time-series data (e.g., ECG data sample) in relation to time 404. Here the heartbeat is a supraventricular (Class SVEB) rhythm in which the solid line is the prototype while the dotted lines are inputs with top ranked weights for the corresponding prototypes.

FIG. 4G is a graphical representations of magnitude 402 of time-series data (e.g., ECG data sample) in relation to time 404. Here the heartbeat is a ventricular ectopic beat (Class VEB) rhythm in which the solid line is the prototype while the dotted lines are inputs with top ranked weights for the corresponding prototypes. FIG. 4H is a graphical representations of magnitude 402 of time-series data (e.g., ECG data sample) in relation to time 404. Here the heartbeat is a ventricular ectopic beat (Class VEB) rhythm in which the solid line is the prototype while the dotted lines are inputs with top ranked weights for the corresponding prototypes. FIG. 4I is a graphical representations of magnitude 402 of time-series data (e.g., ECG data sample) in relation to time 404. Here the heartbeat is a ventricular ectopic beat (Class VEB) rhythm in which the solid line is the prototype while the dotted lines are inputs with top ranked weights for the corresponding prototypes.

Figure 4J:
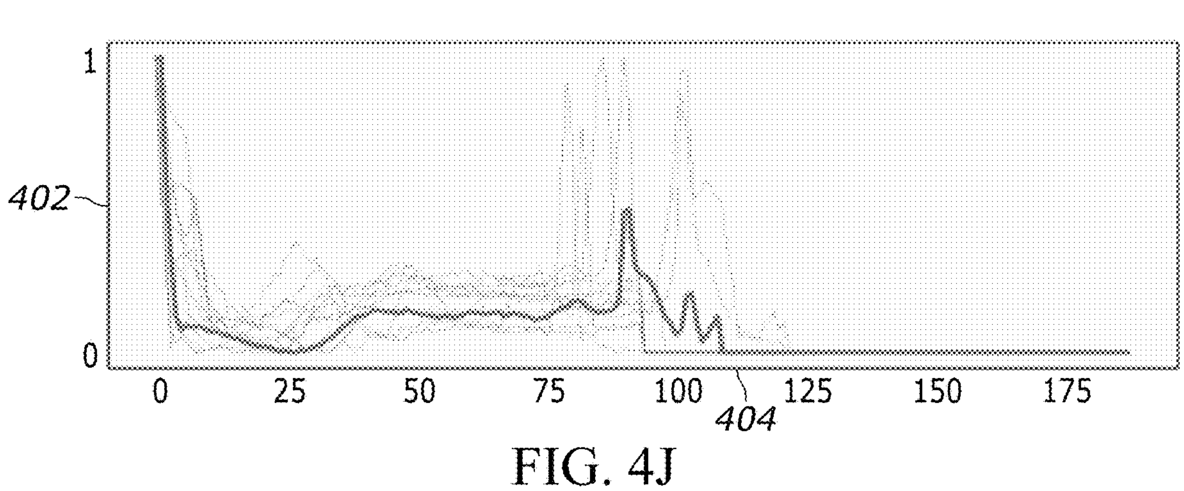
Figure 4K:
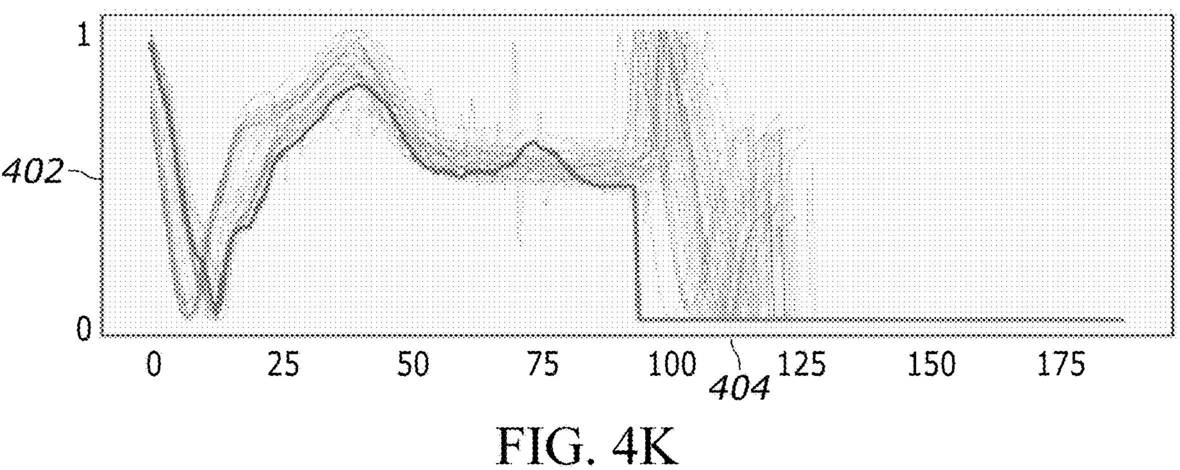
Figure 4L:
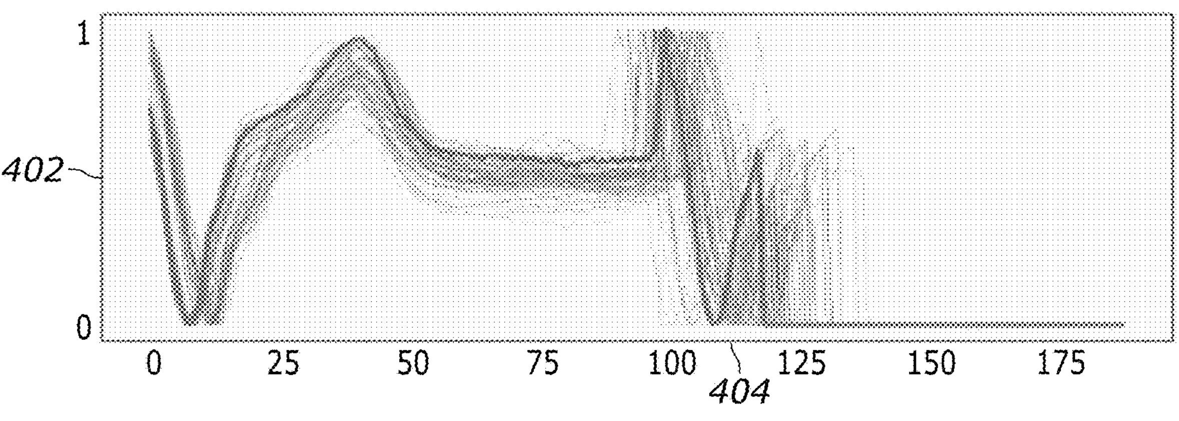

FIG. 4J is a graphical representations of magnitude 402 of time-series data (e.g., ECG data sample) in relation to time 404. Here the heartbeat is a Q wave (Class Q) rhythm in which the solid line is the prototype while the dotted lines are inputs with top ranked weights for the corresponding prototypes. FIG. 4K is a graphical representations of magnitude 402 of time-series data (e.g., ECG data sample) in relation to time 404. Here the heartbeat is a Q wave (Class Q) rhythm in which the solid line is the prototype while the dotted lines are inputs with top ranked weights for the corresponding prototypes. FIG. 4L is a graphical representations of magnitude 402 of time-series data (e.g., ECG data sample) in relation to time 404. Here the heartbeat is a Q wave (Class Q) rhythm in which the solid line is the prototype while the dotted lines are inputs with top ranked weights for the corresponding prototypes.

Our analysis using visualizations (FIG. 4) show that these prototypes are good representatives of the ECG data samples. The system may also categorize the prototypes by class labels to analyze if the prototypes capture some distinctive features of that class. The system may find that the prototypes that correspond to class label SVEB and class label VEB have more irregular rhythms compared to the Normal Beats (N) with varying positions of peaks. Prototypes associated the class label Unknown Beat (Q) on the other hand shows a lot of diversity and variation (FIG. 4).

Experiments to verify our matrix factorization approach are explained below. To validate the technique on the MIT-BIH ECG timeseries dataset, the system also deployed ProtoFac on a ResNet-1D model as introduced in. The architecture for this model included 3 'blocks' with kernel sizes, and channel sizes of each as. Each 'block' is composed of 3 1Dconvolution layers (each followed by a batch normalization function). Before making prediction, the system may connect the output from all the 'block' layers to a fully connected layer. To guard for overfitting, the system may use a dropout rate of 0.2. The model is trained with batch size of 512, learning rate of 0.007, and 80 epochs to get the best ground truth accuracy of 98.34% on the validation set. In ResNet-1D the experiment tested ProtoFac's effectiveness by factorizing the layers 'block1', 'block2', 'block3', and 'fully connected', one at a time (refer Table II). While the experiment factorized these layers', the experiment froze the parameters in the up and downstream layers of this model in order to preserve the oracle model. As the system may train the surrogate model, the system would initialize W and H with random weights and then train the weights using SGD (with Adam as the optimization algorithm). W and H matrices are updated per iteration in the gradient descent's training process; after finishing an epoch, ProtoFacretrieves 'k' prototypes. The following experiments on this network to further verify the effectiveness of ProtoFac were also conducted. Comparing with other matrix factorization methods: The experiment compared the accuracy metric of our surrogate model when the activation matrix was factorized using ProtoFac vs. when factorized with traditional non-negative matrix factorization techniques. The experiment used the NIMFA python library's NMF method and assigned the 'explained variance' as the objective function and 'euclidean' as the update metric as input parameters. The experiment found that using ProtoFac the ground truth accuracy of the surrogate model was 98.34% on the ECG Dataset, while using NMF method from NIMFA, the accuracy was 96.65% (factorization layer was 'fully connected' layer). The ground truth accuracy results were 95.94% and 95.02% for ProtoFac and NIMFA respectively when the layer 'block2' was factorized. The Frobenious loss compare to traditional NMF method as shown in Table II shows that our method also consistently performs better to recover the original activation matrix. This proves that our matrix factorization approach performed comparably well with other factorization methods. However, in ProtoFac while the system may factorized the activation matrix, the system may also recovered prototypes to explain the original DNN model with semantically meaningful image patches or shapelets.

Activation Matrix reconstruction: Next, it may be beneficial to verify the effectiveness of ProtoFac to accurately reconstruct the original activation matrix even if there are any missing values in it. To test this, the experiment may programmatically have replaced 20% of the original values from the activation matrix with null values (represented by 0). Then using ProtoFac, the system may have factorized this activation matrix (with part null values). The results show that when the 'fully connected' layer was factorized the ground truth accuracy dropped by only 3.42%, thus proving that the approach of matrix factorization very closely reconstructs the original matrix even if there are missing values in it.

Ablation Studies: Effect of the number of prototypes k: The number of prototypes k may impact the accuracy of the surrogate model. Thus, it may be beneficial to begin the experiment with a low value of k=3 and then gradually increase it to study how the surrogate model's accuracy change with respect to both the oracle model's prediction and the ground truth labels. The experiments are conducted on both CNN-1D for ECG data analysis and VGG19 for image classification. Two layers are selected from each model for the experiment, same as the ones in Table I and Table III. All the experimental results are obtained on a held-out validation dataset.

Figure 5A:
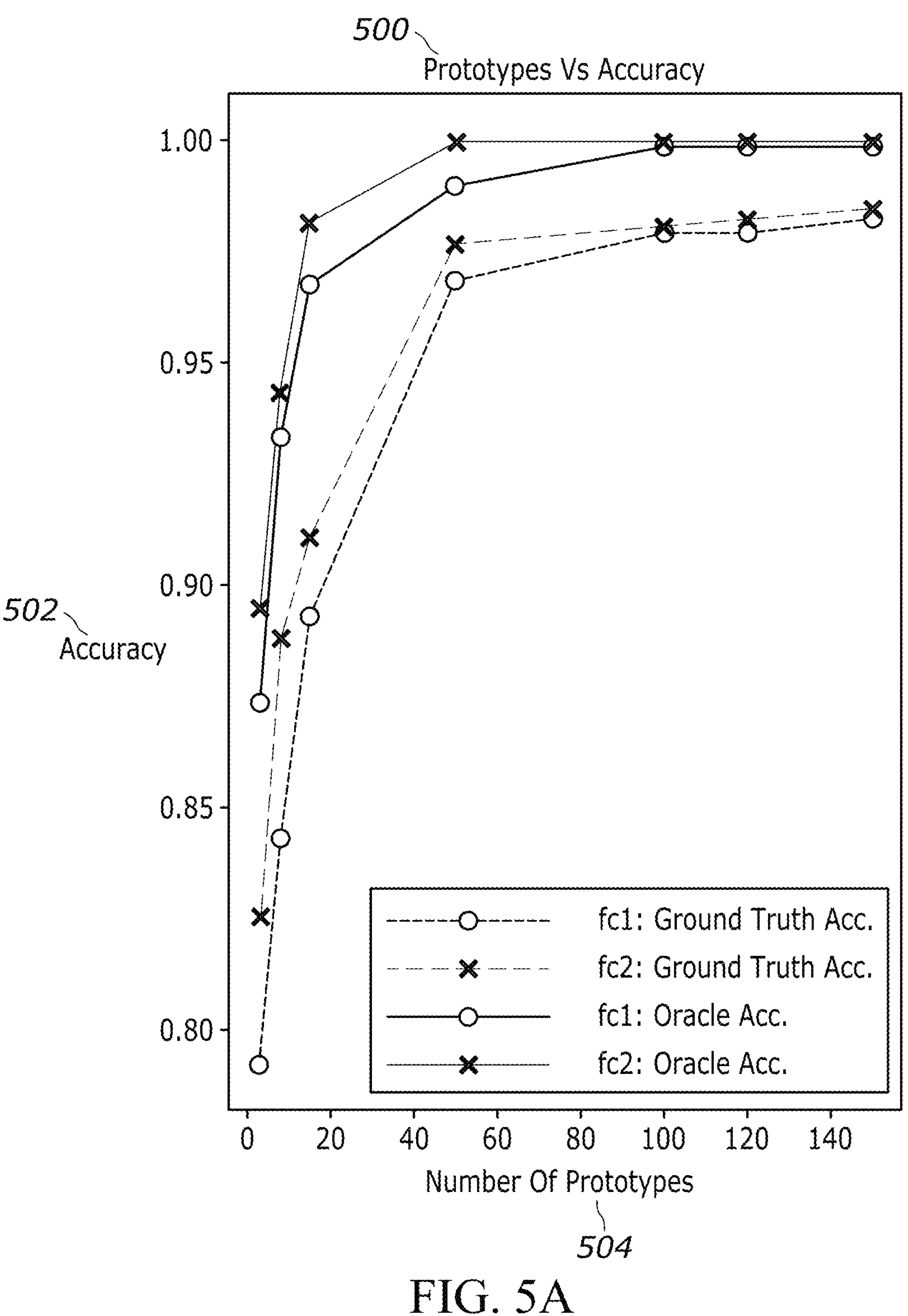
FIG. 5A is a graphical representations of accuracy in relation to number of prototypes for the CNN-1D ECG classification.
Figure 5B:
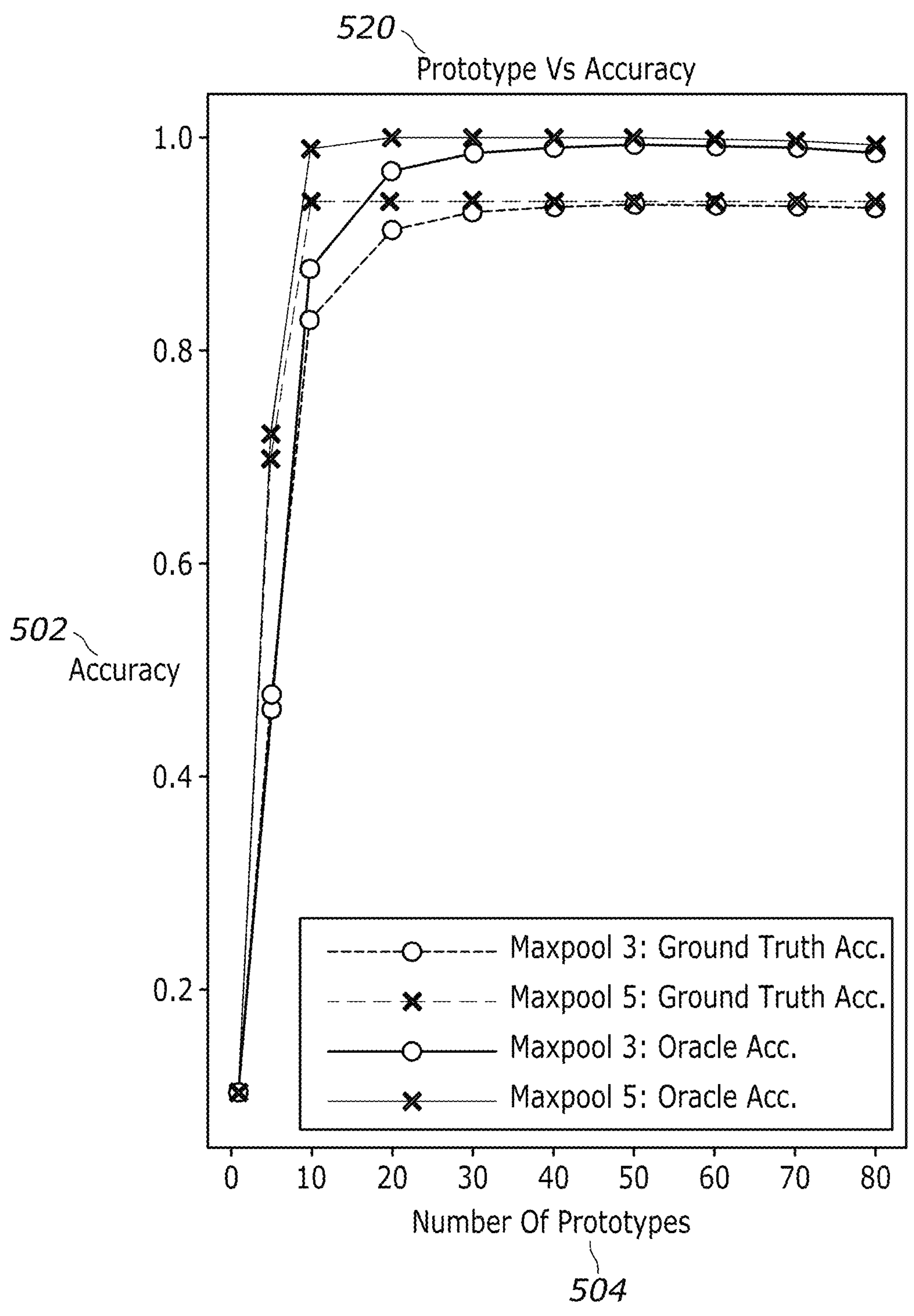
FIG. 5B is a graphical representations of accuracy in relation to number of prototypes for the CIFAR-10 on VGG19 maxpool3 and maxpool5 layers.

FIG. 5. Plot of surrogate model's accuracy (v. ground truth and oracle) in relation to the number of prototypes k. A. accuracy vs. k for the CNN-1D for ECG classification. Note the data is from the two fully connected layers in the CNN model. fc2 is the penultimate layer. B. accuracy vs. k for CIFAR-10 on VGG19 maxpool3 and maxpool5 layers (FIG. 5B).

FIG. 5A is a graphical representations 500 of accuracy 502 in relation to number of prototypes 504 for the CNN-1D ECG classification. FIG. 5B is a graphical representations 520 of accuracy 502 in relation to number of prototypes 504 for the CIFAR-10 on VGG19 maxpool3 and maxpool5 layers.

FIGS. 5A-5B summarizes the results. For both models the experiments observe that as the systems increase k the accuracy of the surrogate model gradually increased and then flattened out for larger k's. The accuracy with respect to the oracle model predictions saturates near 100% and the accuracy with respect to the ground truth labels saturates at the oracle model's validation accuracy. The result shows that with sufficient number of prototypes the surrogate model is able to accurately approximate the original model's output and adding more prototypes after the model saturates has diminishing marginal utility. The curve can also be used to select an appropriate number of prototypes. One approach that was beneficial was to start with a low value of k and then increase it until there are not any significant change in the model's accuracy. In addition, one should consider that having a surrogate model with a high number of prototypes may render the model less interpretable by adding undesirable prototypes as noise. Effect of the selected layer for prototype factorization: FIGS. 5A-5B also shows how the behavior of the surrogate model changes as different layers from DNNs are selected for prototype factorization. For both CNN-1D and VGG19, it may be observed that as the selected layer move closer to output (fc2 in CNN-1D and maxpool5 in VGG19), the surrogate model's performance saturates much faster as k is increased. The reason is that the latter layers generate latent representations that can be more easily separated for prediction.

Crowd-sourced evaluation of Interpretability: Interpretation of a model by non-experts are often driven by subjective aspects. Thus to evaluate effectiveness of our method in helping users interpret models with the aid of prototypes, the experiment may conduct a quantitative evaluation of ProtoFac with human subjects. Through this experiment it may be determined how interpretable and understandable are the prototypes in explaining the prediction of a trained DNN model. For the evaluation, the evaluation may use the VGG19 model trained on CIFAR-10 image classification data (10 class labels) with 60 prototypes extracted from maxpool3. To collect user feedback on the model interpretation the experiment may recruit human participants on Amazon Mechanical Turk (MTurk) who are non-experts in machine learning. The experiment may ask users to fill a survey questionnaire with 20 questions each for image and text data. Experiment Settings and Results (VGG): the experiment generated a set of 20 questions where each question contains an image (for example, the experiment may have sampled two images from each class in CIFAR-10) with a class label and a set of six candidate prototypes as potential explanations to the prediction of the image (see FIG. 6).

FIG. 6 is an illustration 600 of an image 602 with prototypes 604 and sample questions 606.

Figure 7:
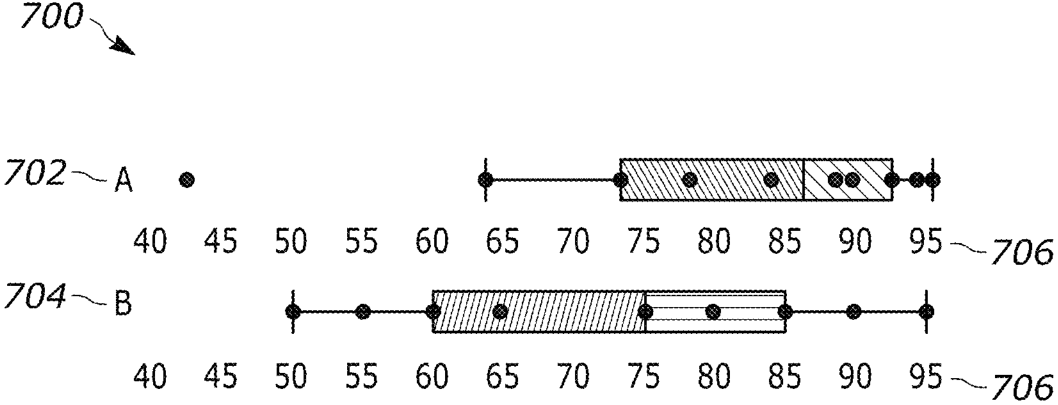
FIG. 7 are box-plots illustrating the distributions of the average alignment scores for different classes and users and the result for a VGG model on CIFAR-10.

Users were asked the following question: "Which of the following options do you think can be used to explain the image (on the left) and its caption (label)?" If none of the shown prototypes explain the image and its label, then users can choose the last option "None of them". Out of the 6 candidate prototypes 2 were prototypes selected by the ProtoFac to explain the prediction, 2 were other prototypes, and 2 were randomly chosen image patches. Through MTurk the experiment collected 58 responses and removed 6 of them for missing entries. From the remaining 52 responses it was analysed the data to find that on average the users' selections align with the algorithm selections for 16.314 (SD=2.37) out of the 20 input images (the system may consider if they are aligned if the user chooses any of the two prototypes). From this result, it can be determined that most of the prototypes generated by a surrogate model are human understandable explanations of the predictions. FIG. 7 analyze the distribution of the average alignment score (percentage of aligned responses) for different classes and the distribution of the average alignment score for different experiment subjects.

FIG. 7 are box-plots 700 illustrating the distributions of the average alignment scores for different classes and users 702 and the result for a VGG model on CIFAR-10 704. Here the scale 706 is an accuracy of the user study.

This post-hoc, model-agnostic interpretation method for general DNNs using the proposed matrix factorization algorithm named ProtoFac decomposes the latent activation in any selected layer in a DNN into a set of prototypes with corresponding weights. This novel optimization objective for ProtoFac considering the various desiderata to obtain post-hoc interpretations of ML models including authenticity, interpretability, and simplicity and propose the corresponding optimization procedure. Through experiments on a variety of DNN architectures for different ML tasks such as time series classification on ECG data and image classification, the experiment may demonstrate that such an algorithm is able to find a set of meaningful prototypes to explain the model's behaviour globally while remaining truthful to reflect the underlying model's operations. The experiment may also be conducted a large scale user study on Amazon Mechanical Turk to evaluate the human interpretability of the extracted prototypes. The results demonstrate that the algorithm is able to extract prototypes that can be easily understood and align well with human intuition and common sense. While the first step is promising, continued effort and further research is needed to scale the solution for larger datasets, more complex models, and for a diverse set of ML tasks.

Figure 8A:
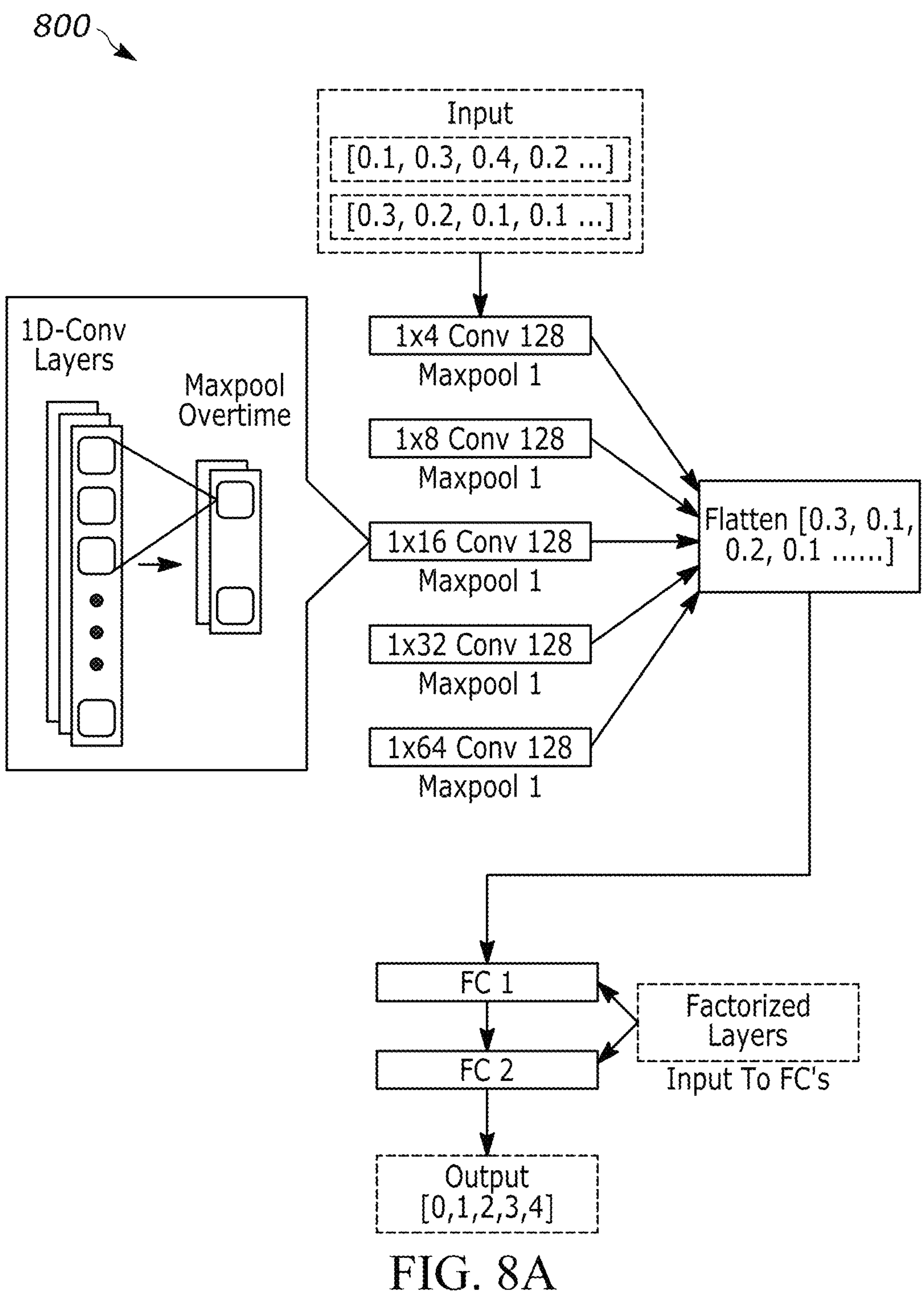
FIG. 8A is a flow diagram of a CNN-1D model architecture for ECG data.
Figure 8B:
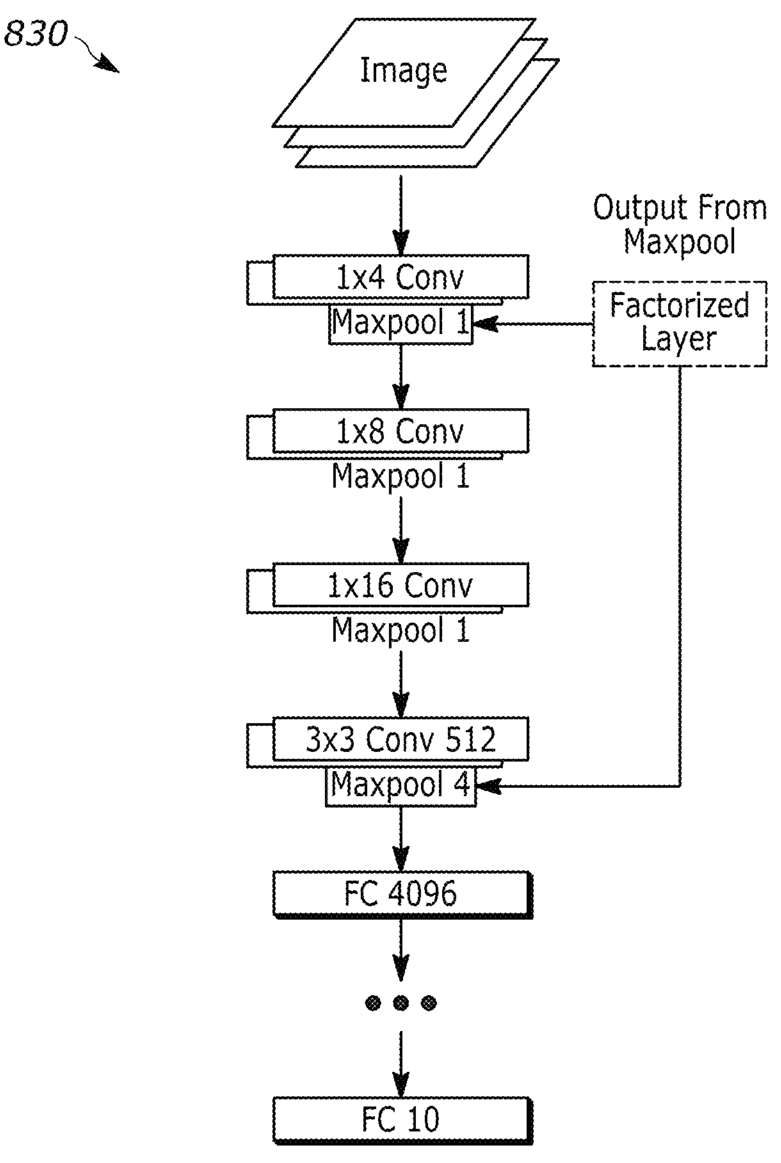
FIG. 8B is a flow diagram of a VGG19 model architecture for CIFAR-10.
Figure 8C:
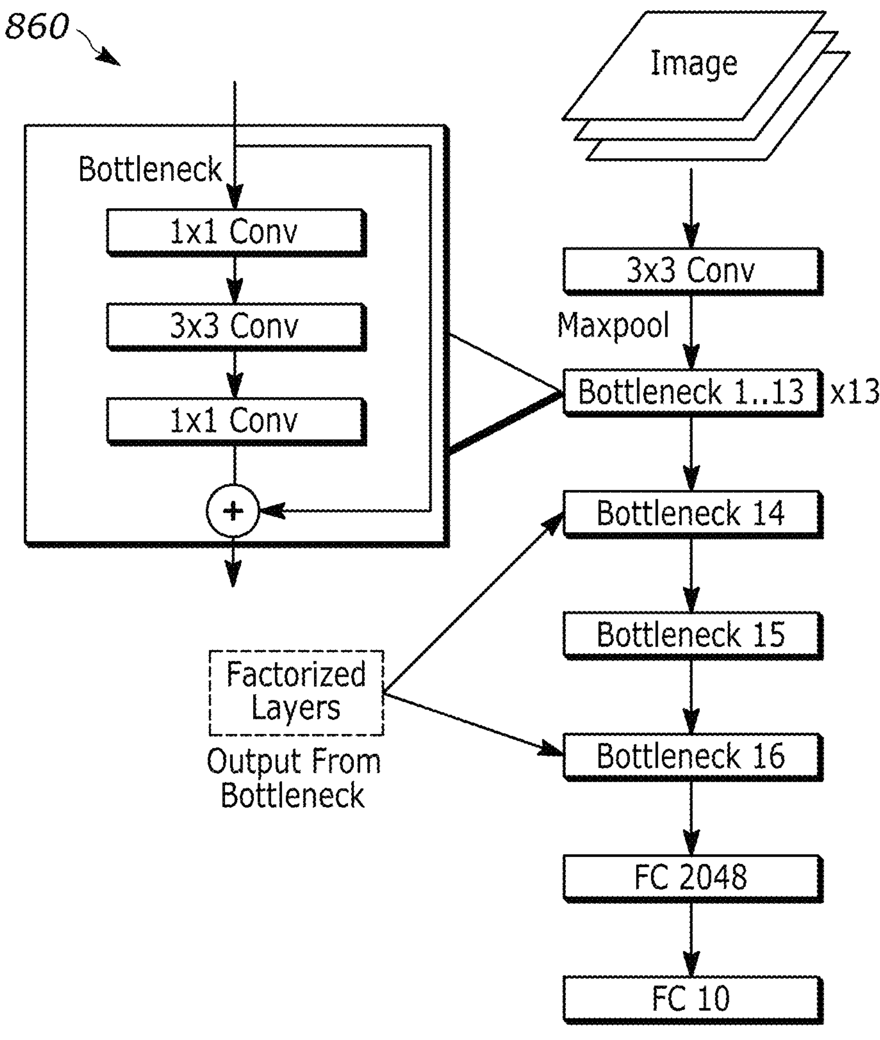
FIG. 8C is a flow diagram of a ResNet50 model architecture for CIFAR-10.

FIG. 8A is a flow diagram of a CNN-1D model architecture for ECG data. This embodiment may include a Convolutional Neural Network for Time Series Classification FIG. 8B is a flow diagram of a VGG19 model architecture for CIFAR-10. This embodiment may include a VGG for image classification FIG. 8C is a flow diagram of a ResNet50 model architecture for CIFAR-10. This is a ResNet for image classification Here a novel visual analytics framework to interpret and diagnose DNNs utilizes ProtoFac to factorize the latent representations in DNNs into weighted combinations of prototypes will be disclosed with exemplar cases (e.g., representative image patches) from the original data. The visual interface uses the factorized prototypes to summarize and explain the model behaviour as well as support comparisons across subsets of data such that the users can form a hypothesis about the model's failure on certain subsets. The method is model-agnostic and provides global explanation of the model behaviour. Furthermore, the system selects prototypes and weights that faithfully represents the model under analysis by mimicking its latent representation and predictions. Example usage scenarios on two DNN architectures and two datasets illustrates the effectiveness and general applicability of the proposed approach.

In recent years, an increasing adoption of deep neural networks (DNNs) in a wide range of application domains for its state-of-the-art performance in many challenging machine learning tasks (e.g. image classification and object detection) and the availability of well-designed deep learning libraries. However, the practical adoption of deep learning in mission critical scenarios such as health care and autonomous driving is often hindered by the lack of interpretability of DNNs. Furthermore, a limited understanding of the model's inner workings often leads to lengthy trial and error processes to tune the hyperparameters when developing the models.

Recent research in interpretable deep learning generally fall into two paradigms: interpret or visualize existing DNNs in a posthoc manner or train inherently interpretable models with built-in explanation mechanisms. The system disclosed below may focus on developing a post-hoc, model-agnostic interpretation and visualization technique, which could provide guiding insights while the users are developing or deploying a wide range of DNN models in practice.

In particular, the system may develop a visual analytics framework for post-hoc explanation of DNNs by extracting and visualizing the prototypes used in the model. The system may utilize ProtoFac (Algorithm 1), an explainable matrix factorization technique that decomposes the latent representation in pre-trained DNNs as weighted combinations of prototypes, which are a small number of exemplars extracted from the original data (e.g., image patches from whole figures, shapelets from time series data). For example, to determine whether an image contains a car, the model would combine prototype patches with wheels and another one with tail lights. Prototype based reasoning is a form of case-based reasoning in which a model's decisions are explained by referencing one or more past examples. It is a common problem solving strategy used in our daily life, e.g., doctors refer to patients treated before to order prescriptions for new patients. Recently, machine learning researchers have developed inherently interpretable DNNs with built-in prototype-based reasoning mechanisms. Our method focuses on post-hoc explanation of existing black-box models.

To provide practical and trustable explanations for model diagnosis, the system may utilize some of the following high-level requirements to develop the framework:

Faithful to the original model. The explanation should reflect the model's behavior in a authentic manner so that the system can analyze the original model as it is instead of being misled by the artifacts generated by the interpretation techniques as emphasized in a recent survey. The system may utilize ProtoFac to address this problem. It builds a surrogate model with the prototypes that accurately mimics the original model's behavior.

Provideglobalexplanation. While local explanation techniques (e.g., saliency maps) can provide insights into the model's underlying operations it can be limited to explain only one or a few instances at a time. To help users obtain a global understanding of the model, the system may visualize the identified prototypes (the number is usually much smaller than the training data) as well as the distribution of their weights for the instances in each class in the visualization interface.

Support comparative analysis. For model diagnosis, it is crucial to understand the model's behavior on different subsets of data, e.g., the data correctly classified and those not. The system may visualize the prototype weights across different subsets of data based on user selections to support effective comparative analysis such that the user can form hypotheses by observing the differences.

In addition to fulfilling the requirements mentioned above, the system may support exploratory analysis by providing detail on-demand and a variety of user interactions. The system may demonstrate the utility and general applicability of the system through example usage scenarios on two widely used convolutional neural networks (CNNs) for image classification as a preliminary study, including VGG and ResNet. Two public benchmark datasets are used in the study, including CIFAR-10 and fashion-MNIST. To summarize, the system may include:

A framework for post-hoc, model-agnostic interpretation and diagnosis of DNNs through weighted combinations of prototypes.

A visual interface that summarizes the model's behavior through prototypes and their corresponding weights on different subsets of data based on users specifications.

Example usage scenarios on two popular DNNs for image classification and two different image datasets.

In recent years interpretable machine learning (IML) is becoming an increasingly important research topic as people recognize trustability, fairness, and reliability as critical components for the deployment of machine learning models in many application scenarios. While there is no widely accepted definition of interpretability in the research community, the work on IML for DNNs can generally be categorized into two types based on a recent survey: 1) developing models with inherent interpretability and 2) post-hoc explanation of existing DNNs.

DNNs with inherent interpretability often utilize attention modules to learn weights on the input features to interpret the predicted results. Recently, some DNNs also incorporate prototype layers for inherent interpretability, which directly extracts exemplar cases in the training process for later inference. The system may also utilize the idea of prototype learning. However, the prototypes are extracted post-hoc and can be applied in a model-agnostic manner to existing trained DNNs.

For post-hoc model interpretation, popular approaches include extracting a saliency map, scoring the importance on the input deep features, and backtracking the influence functions to predictions. The feature importance can be computed by either calculating the local gradient (e.g., Grad-CAM) or by adding local perturbations and analyzing the sensitivity of the output concerning the perturbation e.g., SmoothGrad, LIME, and SHAP). Other methods aim at extracting important concepts from the latent activation space, examples include TCAV or making efforts on localizing class-specific discriminative regions. However, such an approach requires externally labeled concept data to train the concept vectors.

One of the most straightforward ways to interpret a machine learning model is to introduce a surrogate model to mimic the behavior of a black-box model. Linear models or a decision tree are considered as basic surrogate models. Our method is derived from the concept of using surrogate model to factorize latent representations, namely prototypes, associated with their weights as one important measuring metrics for serving model-agnostics and interpretability.

Revising the ProtoFac Algorithm from above: this brief description of ProtoFac, which is the method utilized to factorize latent activation in DNNs into weighted prototypes. The algorithm, as illustrated in FIG. 1, factorizes a selected layer's activation matrix to find k prototypes and their respective weights for each input instance. Assuming the latent representation at layer l is a fixed-length vector with m dimensions and the total number of input instances is n, $A^l$ will be a n×m matrix. ProtoFac decomposes $A^l$ to obtain $$A^l_{n\times m} \approx W_{n\times k} \cdot H_{k\times m}.$$

For user-friendly explanation, the prototype vectors $h_j$ ($0 \le j < k$) are constrained to be the latent representations of realistic data samples, e.g., image patches, at layer l.

Looking back at FIG. 1: ProtoFac identifies prototypes and their corresponding weights to build a surrogate model. It replaces the activation matrix at a selected DNN layer l with weighted combinations of prototype vectors in H.

The system may include a surrogate model that substitutes the activation matrix $A_l$ with W×H and feeds it to the downstream network after layer l to obtain a new set of predictions which should highly resemble the original model's oracle prediction. In this way, the learned weights and prototypes could faithfully reflect the original model's behavior.

In particular, the system may include the following two loss terms in the optimization objective to factorize A into W and H: (1) Frobenius norm of the factorization residual $$L_f = \frac{1}{n} \left\| A^l - W \times H \right\|_{-F}.$$

The goal is to minimize uninterpreted residuals if the system may replace the original activation matrix with the weighted combination of prototypes at layer l; (2) Cross entropy loss comparing oracle model's and the interpretation surrogate's predictions, denoted as $L_{ce}$. Both W and H are non-negative matrices. The prototype vectors in H are constrained to be latent representations of realistic data samples, e.g., image patches at layer l.

The full optimization objective and the training procedure to obtain W and H was verified via quantitative evaluation results and a user study conducted on Amazon Mechanical Turk to evaluate the identified prototypes' interpretability.

Experimental Evaluation of ProtoFac may be conducted via a series of experiments to examine the changes of the surrogate model's fidelity to the original model using ProtoFac to factorize different latent layer and select different amounts of prototypes. The disclosure below may report the experimental results of image classification tasks using VGG19 and ResNet50 on CIFAR10. Additional experimental results and explanations on different DNNs and tasks were obtained.

Table IV summarizes the experimental results. The experiments validated the surrogate model prediction accuracy with respect to both ground truth and the original model, namely accuracy vs. oracle. Note that the surrogate model is not used directly for classifying the images rather than mimicking the oracle performance (original model). The result shows that the surrogate model can achieve high fidelity to the original model—the accuracy of the surrogate models with respect to the oracle models' predictions (Acc. (vs. oracle) in Table IV).

TABLE IV

Experimental results on VGG and ResNet for image classification tasks.

| Dataset | Model | Acc. (valid) | Factorized Layer | k | Acc.(vs. oracle) | Acc.(vs. groundtruth) | F-loss (ProtoFac) |
|---|---|---|---|---|---|---|---|
| CIFAR-10 | VGG19 | 94.25 | maxpool3 | 60 | 96.10% | 90.65% | 0.0006 |
| | | | maxpool3 | 120 | 98.45% | 92.80% | 0.0006 |
| | | | maxpool5 | 60 | 97.26% | 93.24% | 0.0014 |
| | ResNet50 | 94.38 | bottleneck14 | 60 | 98.35% | 94.15% | 0.0006 |
| | | | bottleneck14 | 120 | 99.15% | 94.30% | 0.0007 |
| | | | bottleneck16 | 60 | 99.65% | 94.35% | 0.0007 |

Furthermore, the experiments conducted crowd-sourced evaluation to quantitatively evaluate effectiveness of our method in helping users interpret models with the aid of prototypes with human subjects. For the evaluation, the system used the VGG19 model trained on CIFAR-10 image classification data (10 class labels) with 60 prototypes extracted from maxpool3. To collect user feedback on the model interpretation, the experiment may recruit human participants on Amazon Mechanical Turk (MTurk) who are non-experts in machine learning. The experiment may ask users to fill a survey questionnaire with 20 questions each for image and text data.

The experiment generated a set of 20 questions where each question contains an image (the system sampled two images from each class in CIFAR-10) with a class label and a set of six candidate prototypes as potential explanations to the prediction of the image (see an example in FIG. 6).

From the remaining 52 responses an analysis of the data to find that on average the users' selections align with the algorithm selections for 16.314 (SD=2.37) out of the 20 input images (the experiment can consider they are aligned if the user chooses any of the two prototypes). From this result the experiment can conclude that most of the prototypes generated by our surrogate model are human understandable explanations of the predictions. Local explanation heatmaps produced by (b) Back-propagation, (c) Mask perturbation, (d) Investigation of representations ProtoViewer: A Graphical User Interface to supports model diagnostics by visualizing the prototypes and their weights. Using ProtoFac, the system can obtain a set of weights W and prototypes H to explain the original model's behavior, where the prototypes correspond to realistic input e.g., image patches. ProtoViewer supports model diagnostics by visualizing the prototypes and their weights. The system may first formulate a set of design objectives based on recent surveys on visual analysis of DNNs and discussion with ML experts and then give a detailed description about how the visualization components together in ProtoViewer could help address these design objectives as listed below:

O1 Provide overview of model behaviour with the prototypes.

O2 Support comparative analysis of prototypes used by different subsets of data, e.g., correctly predicted and incorrectly predicted instances for each class.

O3 Visualize fine-grained performance metrics (e.g., confusion matrix) to pinpoint the region of error and help users select subsets of interest for further analysis.

O4 Support grouping instances with similar prototypes weights for cluster analysis.

O5 Visualize the instances with the highest weights on each prototype for detailed analysis.

Figure 9:
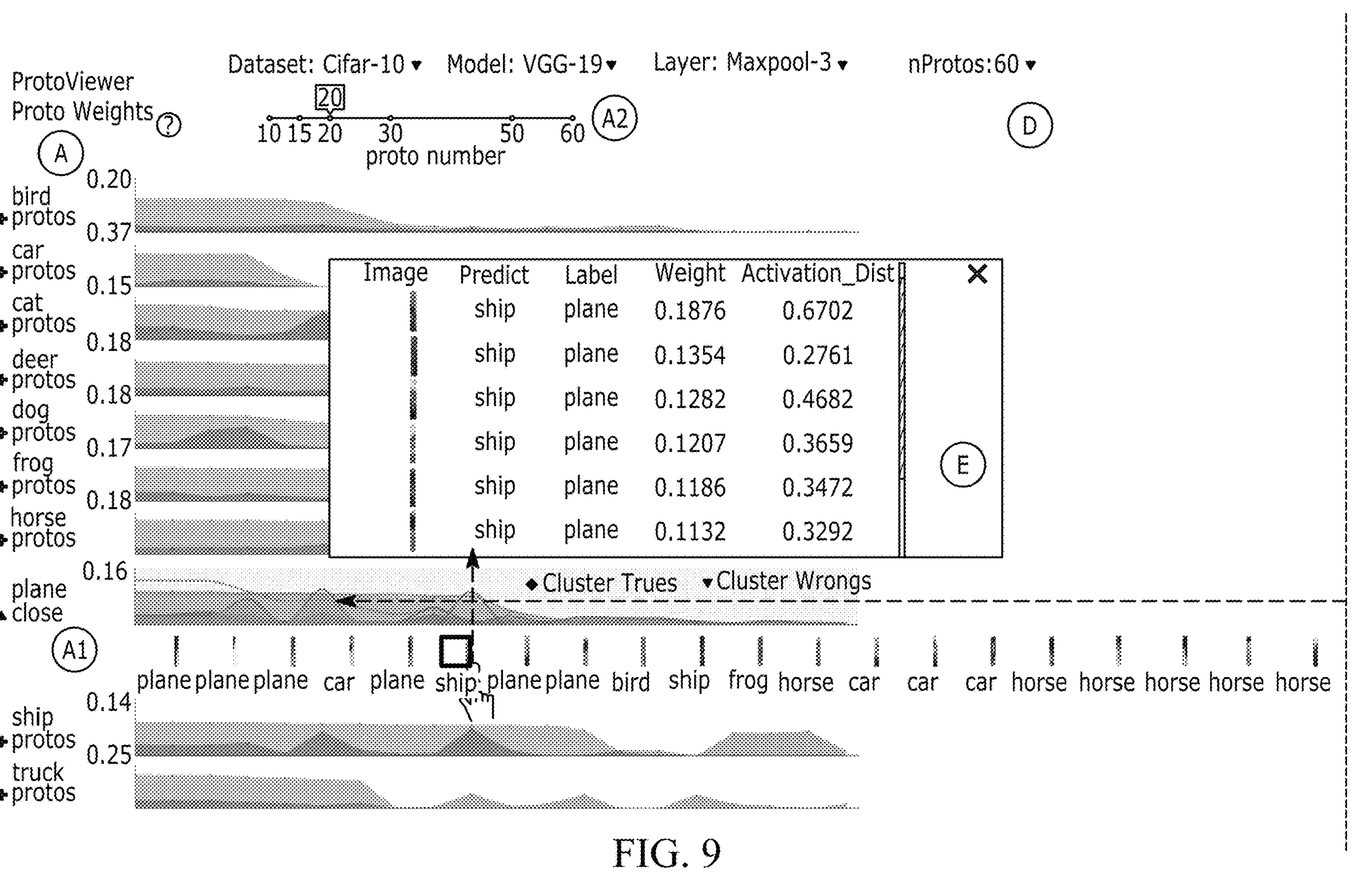
FIG. 9 is an illustration of a graphical user interface used to view differences between model predictions and ground-truth, identify error predictions, view the prototypes associated with the error images, and adjust prototypes and weights for the prototypes.
Figure 9:
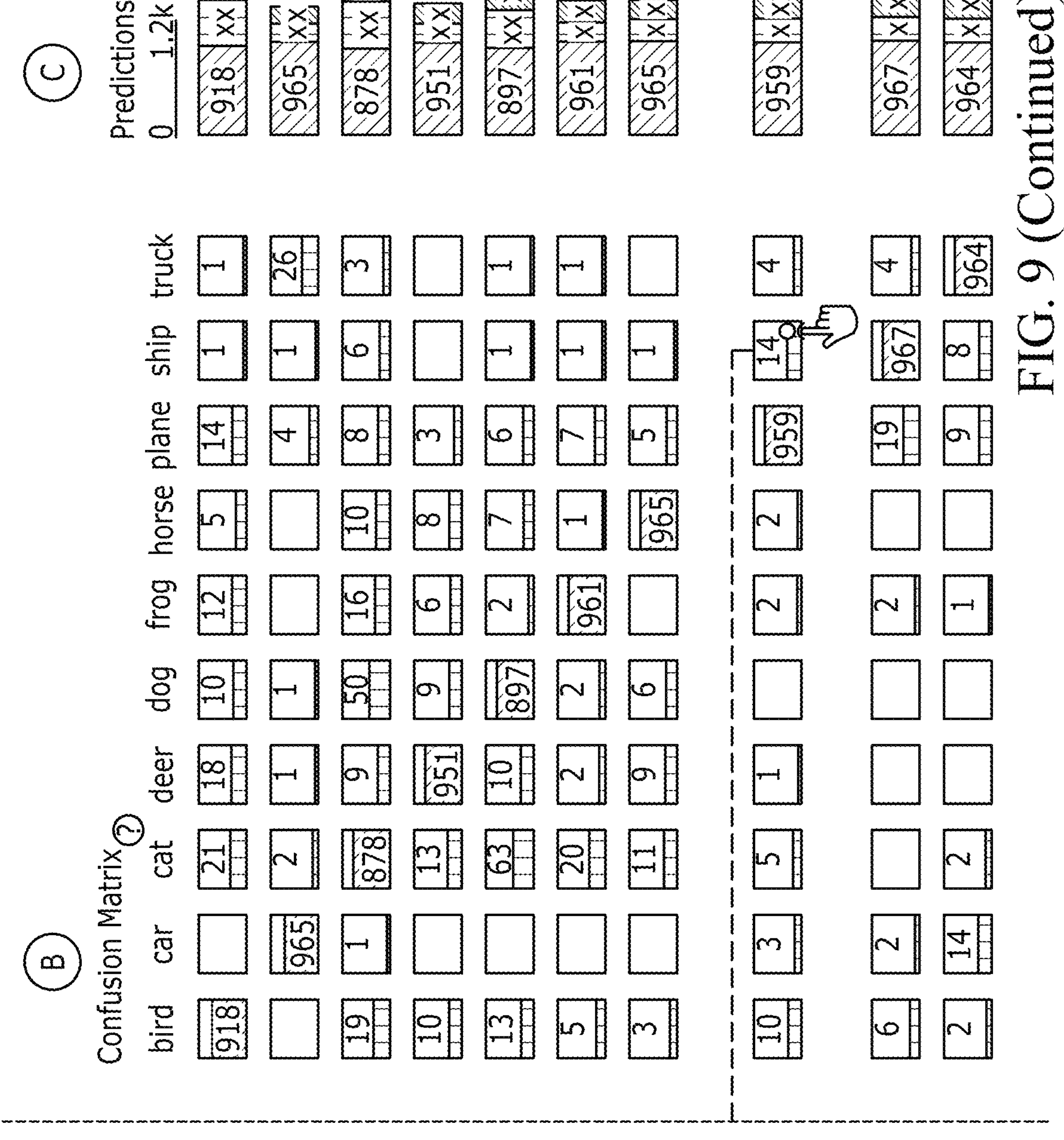

ProtoViewer is composed of several coordinated views as shown in FIG. 9. The prototype visualizer (FIG. 9 (A)) displays the top weighted prototypes for an overview of the main visual concepts used by the model (O1). It first ranks and selects the top k most weighted prototypes from the instances for each class. The average weight on each prototype is calculated separately for correctly and incorrectly predicted instances and visualized in an area chart. The users can compare the weights accordingly and identify the prototypes leading to classification error (O2). The users can click on the '+ protos' button to inspect the top prototypes, e.g., image patches (FIG. 9 (A1)).

The confusion matrix view (FIG. 9 (B)) visualizes detailed model prediction results on different classes (O3). Each row represents the instances in a class based on ground-truth, and each column represents the actual predicted class. The system may use consistent color encoding for the correctly and incorrectly predicted instances. The visualization makes it easy to identify if two classes are often confused with each other. Users can click on the entries in the matrix to select the instances which are one class misclassified as another. Upon selection the prototype visualizer (FIG. 9 (A)) will be updated to display the average weights on the prototypes for the selected instances, displayed in orange in the area chart. It helps the users identify the most relevant prototypes causing the misclassification error (O2). Besides the confusion matrix, in (FIG. 9 (C)) the system may also display the performance of the model on each class to help identify the most problematic classes (O3).

Users can further group the instances by clicking on the two buttons on the top right of the area chart (FIG. 9 (A1)). The system will automatically group the instances based on their weights on the prototypes using k-means. The number of clusters is automatically selected based on the silhouette score. The average weights on the prototypes will be calculated for different clusters and displayed on the graph as well for comparative analysis (O4, O2).

Our system can also display data instances with the highest weights on any selected prototype to provide more details. When users click any of the prototypes, a popup window (FIG. 9 (E)) will display a list of instances retrieved from the database as well as their predicted and actual labels (O5). The detailed information helps the users to form hypotheses about the potential causes of the model's misclassification.

Besides the components mentioned above, the visualization interface also contains a control panel on the top for selecting the dataset, the model, the layer to be factorized, and the number of prototypes (FIG. 9 (D)).

The system is constructed as: the storage module keeps the trained model and the indexed data; the analysis module computes the prototypes and their corresponding weights based on the selected layer, it also clusters the instances based on their prototype weights; the visualization module displays the computed results and support user interactions to select subsets of data and compare their prototypes. The back-end is implemented with Flask. Pytorch is used for DNN implementation and prototype factorization. The front-end is developed with D3JS and ReactJS.

The system may use two example usage scenarios to demonstrate how users can apply ProtoViewer to interpret the prototypes used by the model to gain insights and form hypotheses about the potential reasons for misclassifications. The system may factorize the activation matrix from one selected layer for each neural network and in both cases, ProtoFac can reach over 99% accuracy for restoring the performance of the original (oracle) models while maintaining 94.3% and 91.8% classification accuracy respectively concerning the true label (similar to the original (oracle) model), showing that the factorized prototypes and weights faithfully reflect the behavior and decision making the process of the original model.

Usage Scenario 1: VGG19 on CIFAR-10: Amanda loads a VGG19 network trained on CIFAR-10. The CIFAR-10 dataset contains 10 classes in total, with 1 k images per class. After studying the architecture of VGG19 (FIG. 9), Amanda decides to extract the prototypes by factorizing the activation matrix from the Maxpool-3 layer. The number of prototypes is set to 60 based on experimentation results (Table IV). The selected prototypes are 16×16 image patches from the original 32×32 images. After the factorization completes, the surrogate model returns a 99.5% accuracy using oracle prediction from the original model as ground truth and 94.3% wrt. the true labels. This fact indicates that the surrogate model can be regarded as a substitution of the original model to explain its behavior.

Amanda first looks at the confusion matrix to identify common mistakes made by VGG-19. By looking at the confusion matrix (FIG. 9 (B)) she realizes that many instances with true label plane are incorrectly classified as ship. Therefore, Amanda clicks the entry with column ship and row plane in the confusion matrix to select the misclassified instances. The weights of these instances are displayed on the area chart in orange. Amanda compares it with the average prototype weights for the correctly classified instances displayed in blue and identifies two abnormal peaks. Amanda clicks one prototype corresponding to the peak (the prototype patch is originally from a ship image) to inspect the images with high weights on it in the pop-up window (FIG. 9 (E)). She also limits the display to show only incorrectly classified instances. By looking at these instances, she observes that most of the instances are floating planes on the water, which are frequently mistaken as ship by the model. Since the prototype patch contains mostly water, it indicates that a lot of plane images are misclassified due to the presence of water in it. Moreover, Amanda is also able to obtain some other inspirations while exploring the data with ProtoViewer.

Amanda also applies ProtoViewer to analyze ResNet18 trained on the Fashion-MNIST dataset. She selects the "avgpool" layer (FIG. 1) to factorize the activation matrix and obtain a set of prototypes. The dataset contains 10 k grayscale images divided into ten classes evenly, where each class is a type of apparel such as trouser, t-shirt and sneaker. Each image has 28×28 resolution. She sets the prototypes as 14×14 image patches cropped from the original image and the number of prototypes to be 120. Looking at the confusion matrix, Amanda discovers that there are many images incorrectly predicted as sneaker when their actual label is sandal (FIG. 10 (C1)). She investigates this subset of data by clicking on the corresponding entry in the confusion matrix, and their average weights on the prototypes will be displayed in the area chart in orange. As FIG. 10 (C) shows, there is a high spike corresponding to a prototype cropped from a sneaker image (highlighted with a magenta border)). Amanda clicks on this prototype, and the pop-up window (FIG. 10 (C2)) shows instances with high weight on it. She realizes that most of the high weighted cases are sandals incorrectly classified as sneakers and they share a very similar style on the quarter/counterpart (i.e. the back part of a shoe) which is very solid without any hollows, compared to the typical prototypes in class sandal, which look more hollowed-out, like most of the strap sandals. Amanda, therefore, forms a hypothesis: the model is learning the strap sandal style to distinguish sandals from sneakers, and it can fail when the sandals silhouette is similar to sneakers.

Figure 10:
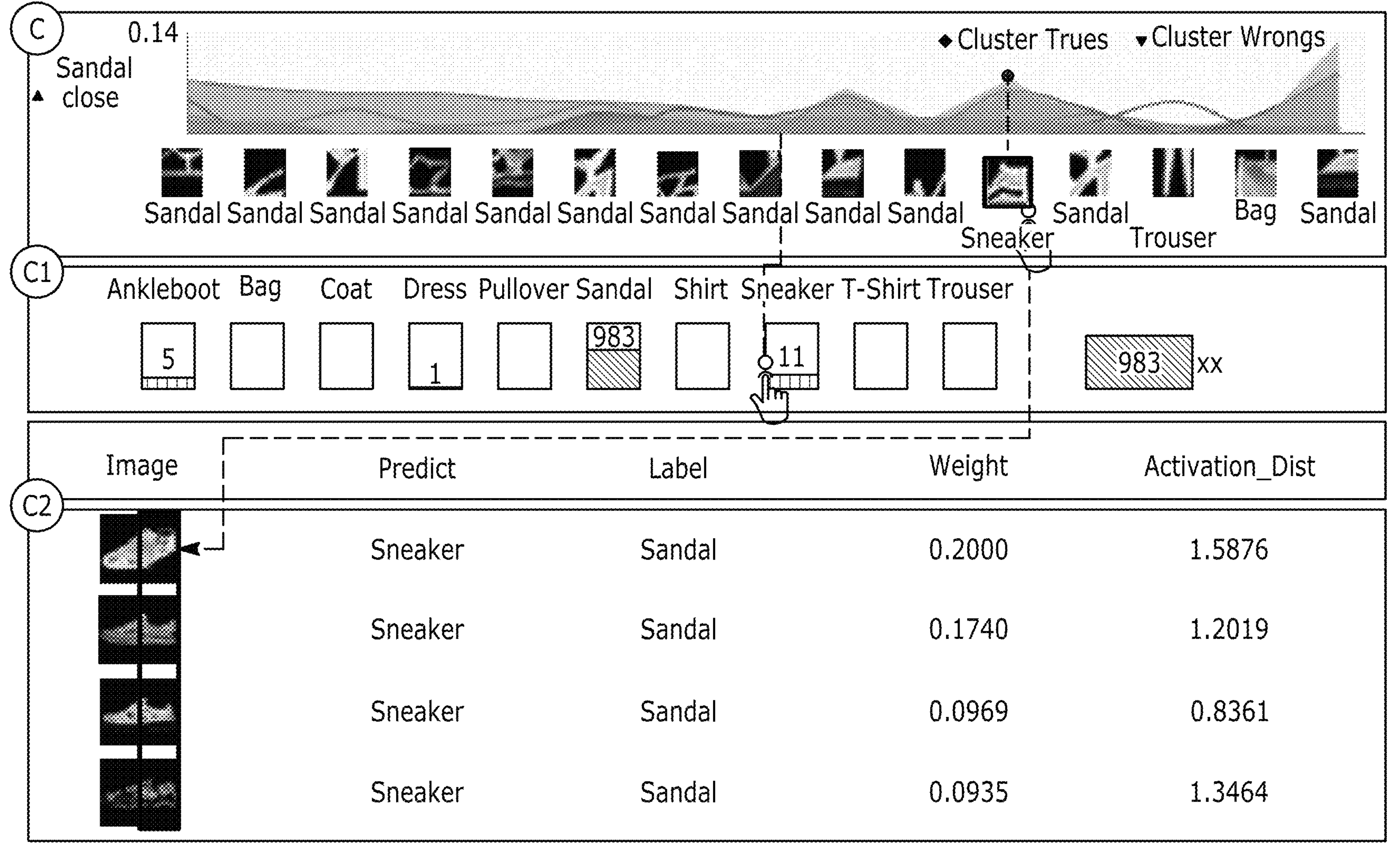
FIG. 10 is an illustration of a graphical user interface for factorize prototypes for a ResNet18 trained on Fashion-MNIST for error predicted instances.

FIG. 10 illustrates ProtoViewer used to analyze a Deep Neural Network trained to classify a Fashion-MNIST dataset. C1 is part of the confusion matrix and it shows that there are many images incorrectly predicted as sneaker when their actual label is sandal. C shows the top-ranked prototypes according to their weights. C2 shows the images with high weights on a prototype sandal.

In this embodiment, the system may include a visual analytics framework to interpret and diagnose DNN models by factorizing the activation matrix into interpretable prototypes and analyzing their weights across different subsets. The method is model-agnostic, and the interpretation stays faithful to the original model by mimicking its internal representations and the output. Two case studies on two different datasets and models illustrate the usability and effectiveness of the system. There is a lot of room for future exploration including conduct long-term user study to evaluate its value for ML developers; investigate the effect of factorizing different layers in a DNN; explore the application to other data types e.g., timeseries, text or audio data; explore different approaches to extract the prototypes, e.g., using super-pixels instead of image patches.

Figure 11:
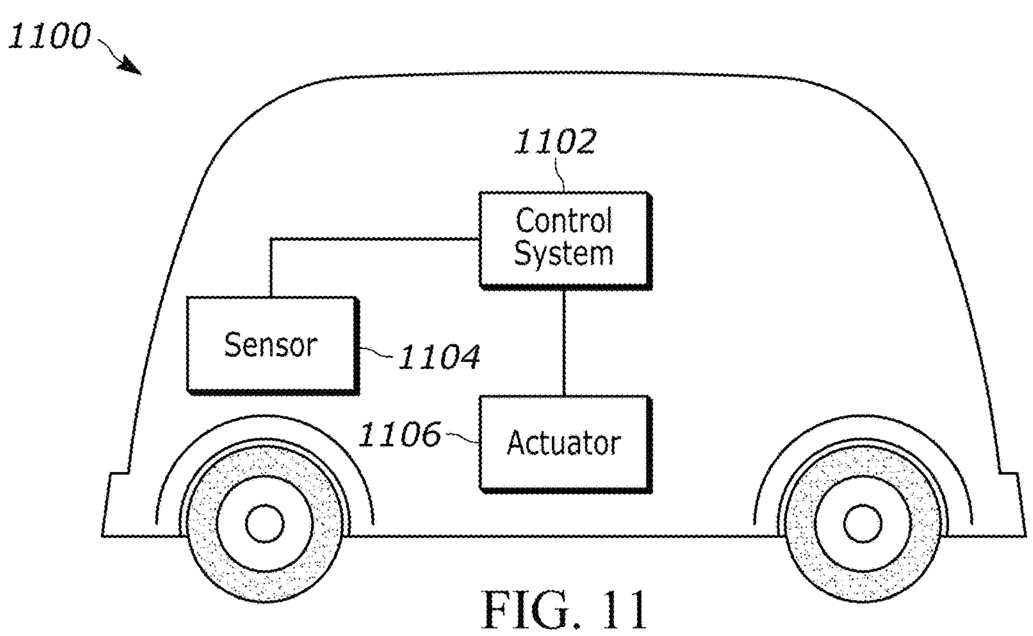
FIG. 11 is a schematic diagram of a control system configured to control a vehicle.

FIG. 11 is a schematic diagram of control system 1102 configured to control a vehicle, which may be an at least partially autonomous vehicle or an at least partially autonomous robot. The vehicle includes a sensor 1104 and an actuator 1106. The sensor 1104 may include one or more visual light based sensor (e.g., a Charge Coupled Device CCD, or video), radar, LiDAR, ultrasonic, infrared, thermal imaging, or other technologies (e.g., positioning sensors such as GPS). One or more of the one or more specific sensors may be integrated into the vehicle. Alternatively or in addition to one or more specific sensors identified above, the control module 1102 may include a software module configured to, upon execution, determine a state of actuator 1104. One non-limiting example of a software module includes a weather information software module configured to determine a present or future state of the weather proximate the vehicle or other location.

In embodiments in which the vehicle is an at least a partially autonomous vehicle, actuator 1106 may be embodied in a brake system, a propulsion system, an engine, a drivetrain, or a steering system of the vehicle. Actuator control commands may be determined such that actuator 1106 is controlled such that the vehicle avoids collisions with detected objects. Detected objects may also be classified according to what the classifier deems them most likely to be, such as pedestrians or trees. The actuator control commands may be determined depending on the classification. In a scenario where an adversarial attack may occur, the system described above may be further trained to better detect objects or identify a change in lighting conditions or an angle for a sensor or camera on the vehicle.

In other embodiments where vehicle 1100 is an at least partially autonomous robot, vehicle 1100 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 1106 may be determined such that a propulsion unit, steering unit and/or brake unit of the mobile robot may be controlled such that the mobile robot may avoid collisions with identified objects.

In another embodiment, vehicle 1100 is an at least partially autonomous robot in the form of a gardening robot. In such embodiment, vehicle 1100 may use an optical sensor as sensor 1104 to determine a state of plants in an environment proximate vehicle 1100. Actuator 1106 may be a nozzle configured to spray chemicals. Depending on an identified species and/or an identified state of the plants, actuator control command 1102 may be determined to cause actuator 1106 to spray the plants with a suitable quantity of suitable chemicals.

Vehicle 1100 may be an at least partially autonomous robot in the form of a domestic appliance. Non-limiting examples of domestic appliances include a washing machine, a stove, an oven, a microwave, or a dishwasher. In such a vehicle 1100, sensor 1104 may be an optical sensor configured to detect a state of an object which is to undergo processing by the household appliance. For example, in the case of the domestic appliance being a washing machine, sensor 1104 may detect a state of the laundry inside the washing machine. Actuator control command may be determined based on the detected state of the laundry.

In this embodiment, the control system 1102 would receive image and annotation information from sensor 1104. Using these and a prescribed number of classes k and similarity measure $\overline{K}$ that are stored in the system, the control system 1102 may use the method described in FIG. 10 to classify the image received from sensor 1104. Based on this classification, signals may be sent to actuator 1106, for example, to brake or turn to avoid collisions with pedestrians or trees, to steer to remain between detected lane markings, or any of the actions performed by the actuator 1106 as described above in sections 0067-0071. Signals may also be sent to sensor 1104 based on this classification, for example, to focus or move a camera lens.

Figure 12:
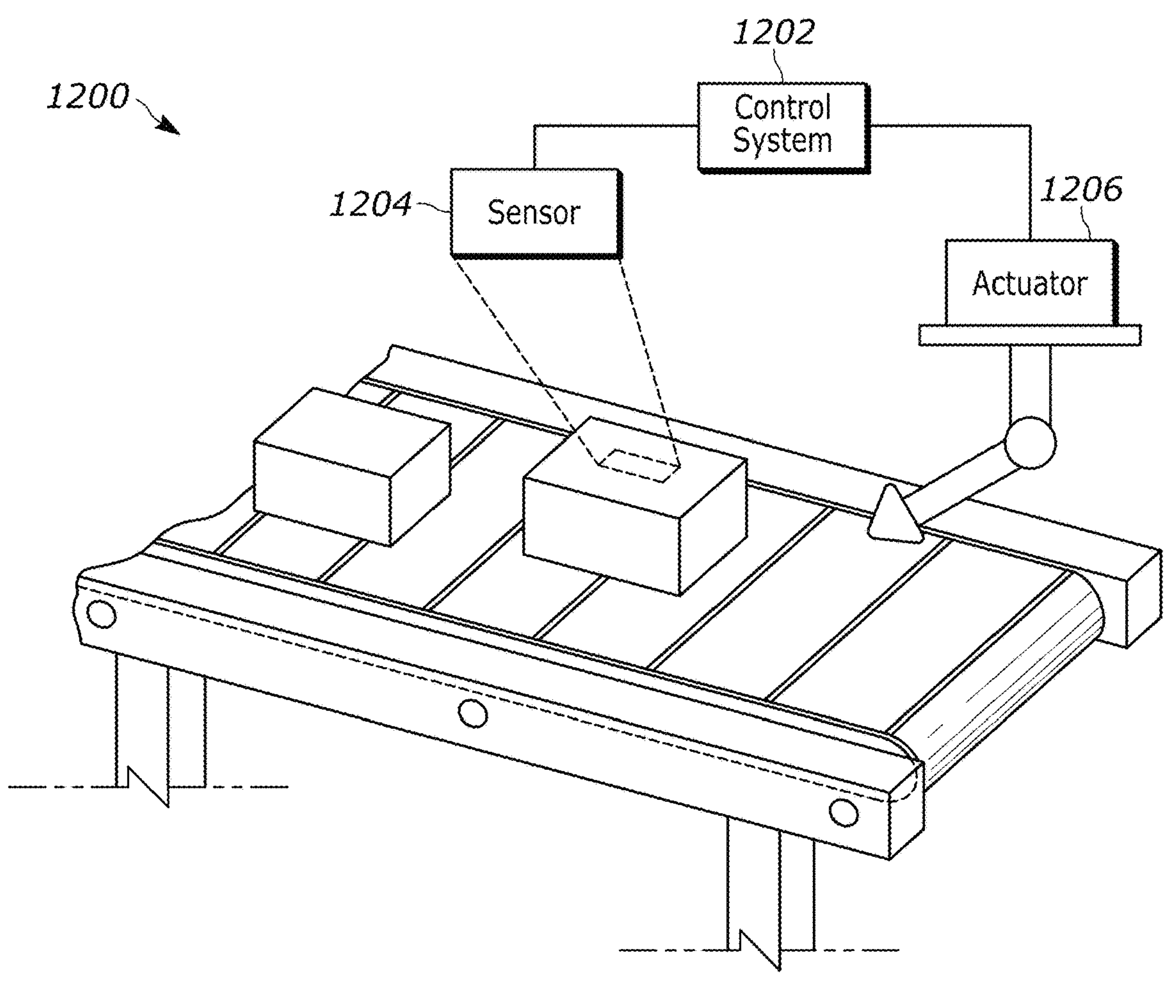
FIG. 12 is a schematic diagram of a control system configured to control a manufacturing machine.

FIG. 12 depicts a schematic diagram of control system 1202 configured to control system 1200 (e.g., manufacturing machine), such as a punch cutter, a cutter or a gun drill, of manufacturing system 102, such as part of a production line. Control system 1202 may be configured to control actuator 14, which is configured to control system 100 (e.g., manufacturing machine).

Sensor 1204 of system 1200 (e.g., manufacturing machine) may be an optical sensor configured to capture one or more properties of manufactured product 104. Control system 1202 may be configured to determine a state of manufactured product 104 from one or more of the captured properties. Actuator 1206 may be configured to control system 1202 (e.g., manufacturing machine) depending on the determined state of manufactured product 104 for a subsequent manufacturing step of manufactured product 104. The actuator 1206 may be configured to control functions of system 100 (e.g., manufacturing machine) on subsequent manufactured product 106 of system 100 (e.g., manufacturing machine) depending on the determined state of manufactured product 104.

In this embodiment, the control system 1202 would receive image and annotation information from sensor 1204. Using these and a prescribed number of classes k and similarity measure $\overline{K}$ that are stored in the system, the control system 1202 may use the method described in FIG.

10 to classify each pixel of the image received from sensor 1204. Based on this classification, signals may be sent to actuator 1206, for example, to segment an image of a manufactured object into two or more classes, to detect anomalies in the manufactured product, or any of the actions performed by the actuator 1206 as described in the above sections. Signals may also be sent to sensor 1104 based on this classification, for example, to focus or move a camera lens.

Figures 13, 14:
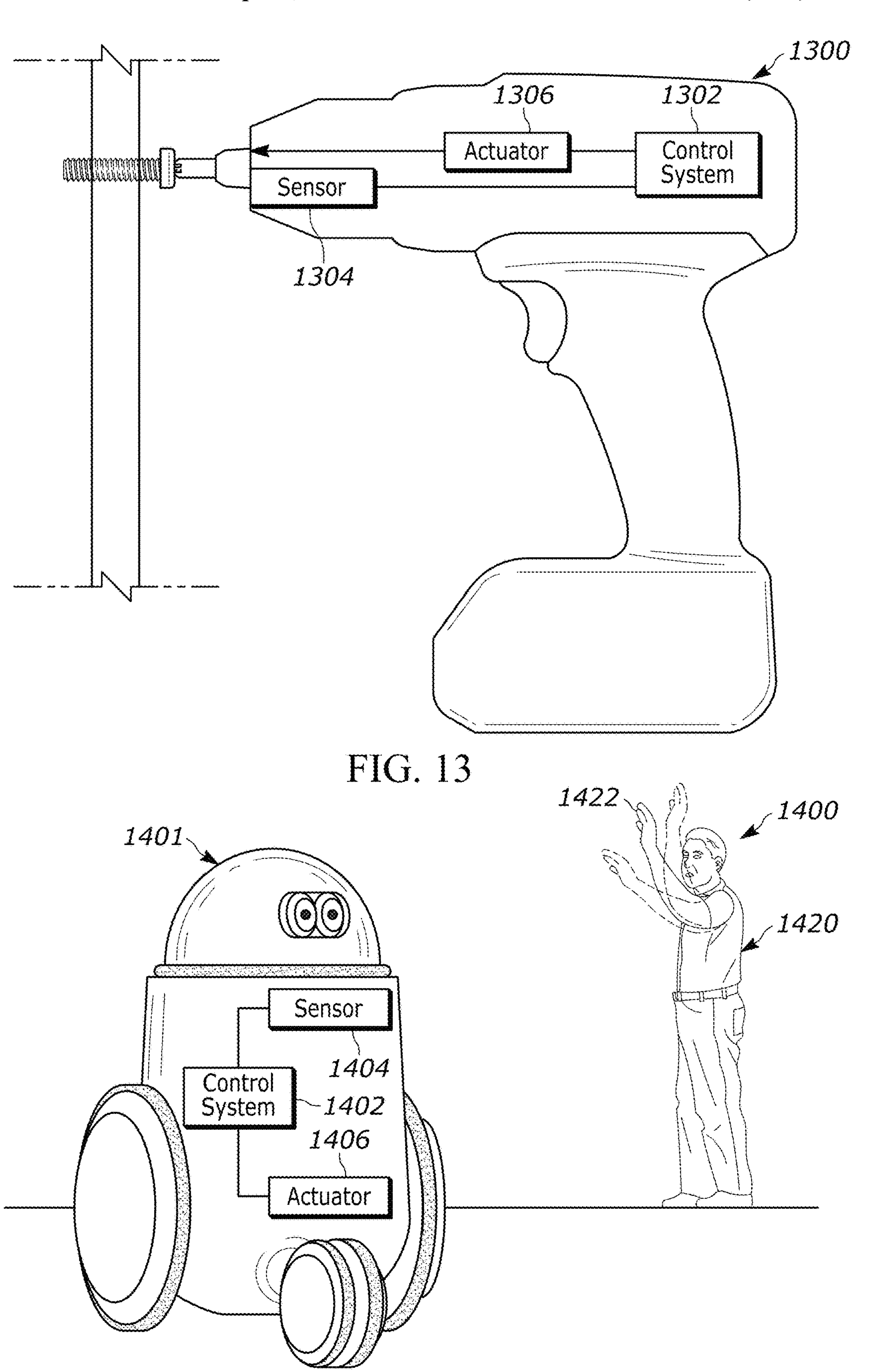
FIG. 13 is a schematic diagram of a control system configured to control a power tool.
FIG. 14 is a schematic diagram of a control system configured to control an automated personal assistant.

FIG. 13 depicts a schematic diagram of control system 1302 configured to control power tool 1300, such as a power drill or driver, that has an at least partially autonomous mode. Control system 1302 may be configured to control actuator 1306, which is configured to control power tool 1300.

Sensor 1304 of power tool 1300 may be an optical sensor configured to capture one or more properties of a work surface and/or fastener being driven into the work surface. Control system 1302 may be configured to determine a state of work surface and/or fastener relative to the work surface from one or more of the captured properties.

In this embodiment, the control system 1302 would receive image and annotation information from sensor 1304. Using these and a prescribed number of classes k and similarity measure 17 that are stored in the system, the control system 1302 may use the method described in FIG. 10 to classify each pixel of the image received from sensor 1304. Based on this classification, signals may be sent to actuator 1306, for example, to segment an image of a work surface or fastener into two or more classes, to detect anomalies in the work surface or fastener, or any of the actions performed by the actuator 1306 as described in the above sections. Signals may also be sent to sensor 1304 based on this classification, for example, to focus or move a camera lens.

FIG. 14 depicts a schematic diagram of control system 1402 configured to control automated personal assistant 1401. Control system 1402 may be configured to control actuator 1406, which is configured to control automated personal assistant 1401. Automated personal assistant 1401 may be configured to control a domestic appliance, such as a washing machine, a stove, an oven, a microwave or a dishwasher.

In this embodiment, the control system 1402 would receive image and annotation information from sensor 1404. Using these and a prescribed number of classes k and similarity measure $\overline{K}$ that are stored in the system, the control system 1402 may use the method described in FIG. 10 to classify each pixel of the image received from sensor 1404. Based on this classification, signals may be sent to actuator 1406, for example, to segment an image of an appliance or other object to manipulate or operate, or any of the actions performed by the actuator 1406 as described in the above sections. Signals may also be sent to sensor 1404 based on this classification, for example, to focus or move a camera lens.

Figure 15:
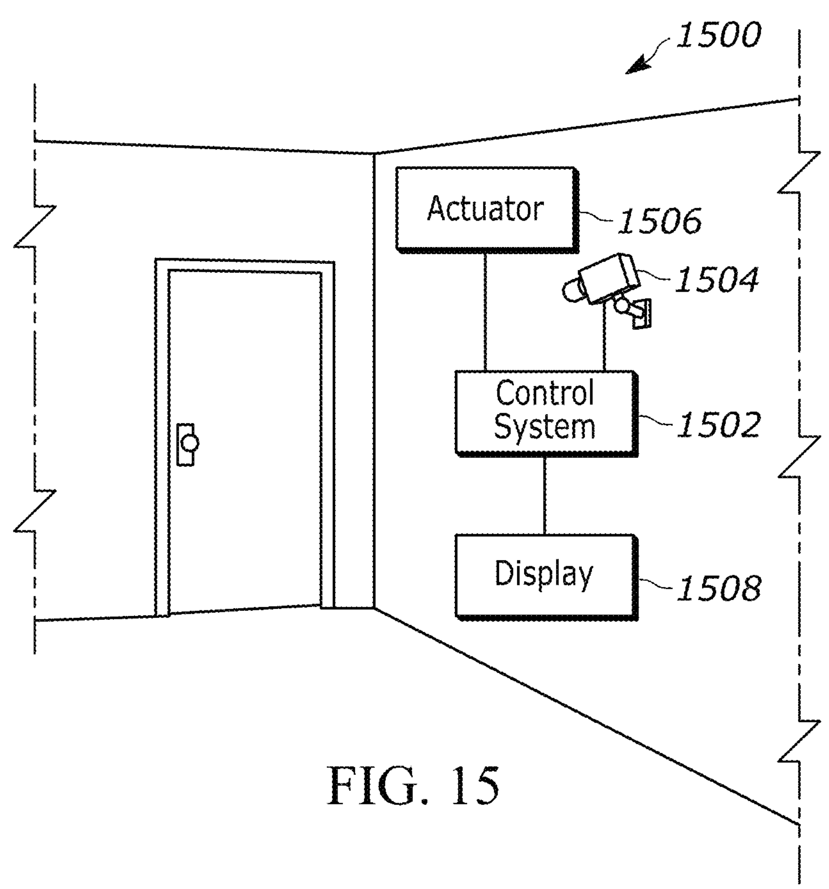
FIG. 15 is a schematic diagram of a control system configured to control a monitoring system.

FIG. 15 depicts a schematic diagram of control system 1502 configured to control monitoring system 1500. Monitoring system 1500 may be configured to physically control access through door 252. Sensor 1504 may be configured to detect a scene that is relevant in deciding whether access is granted. Sensor 1504 may be an optical sensor configured to generate and transmit image and/or video data. Such data may be used by control system 1502 to detect a person's face.

Monitoring system 1500 may also be a surveillance system. In such an embodiment, sensor 1504 may be an optical sensor configured to detect a scene that is under surveillance and control system 1502 is configured to control display 1508. Control system 1504 is configured to determine a classification of a scene, e.g. whether the scene detected by sensor 1504 is suspicious. A perturbation object may be utilized for detecting certain types of objects to allow the system to identify such objects in non-optimal conditions (e.g., night, fog, rainy, etc.). Control system 1502 is configured to transmit an actuator control command to display 1508 in response to the classification. Display 1508 may be configured to adjust the displayed content in response to the actuator control command. For instance, display 1508 may highlight an object that is deemed suspicious by controller 1502.

In this embodiment, the control system 1502 would receive image and annotation information from sensor 1504. Using these and a prescribed number of classes k and similarity measure $\overline{K}$ that are stored in the system, the control system 1502 may use the method described in FIG. 10 to classify each pixel of the image received from sensor 1504. Based on this classification, signals may be sent to actuator 1506, for example, to detect the presence of suspicious or undesirable objects in the scene, to detect types of lighting or viewing conditions, to detect movement, or any of the actions performed by the actuator 1506 as described in the above sections. Signals may also be sent to sensor 1504 based on this classification, for example, to focus or move a camera lens.

Figure 16:
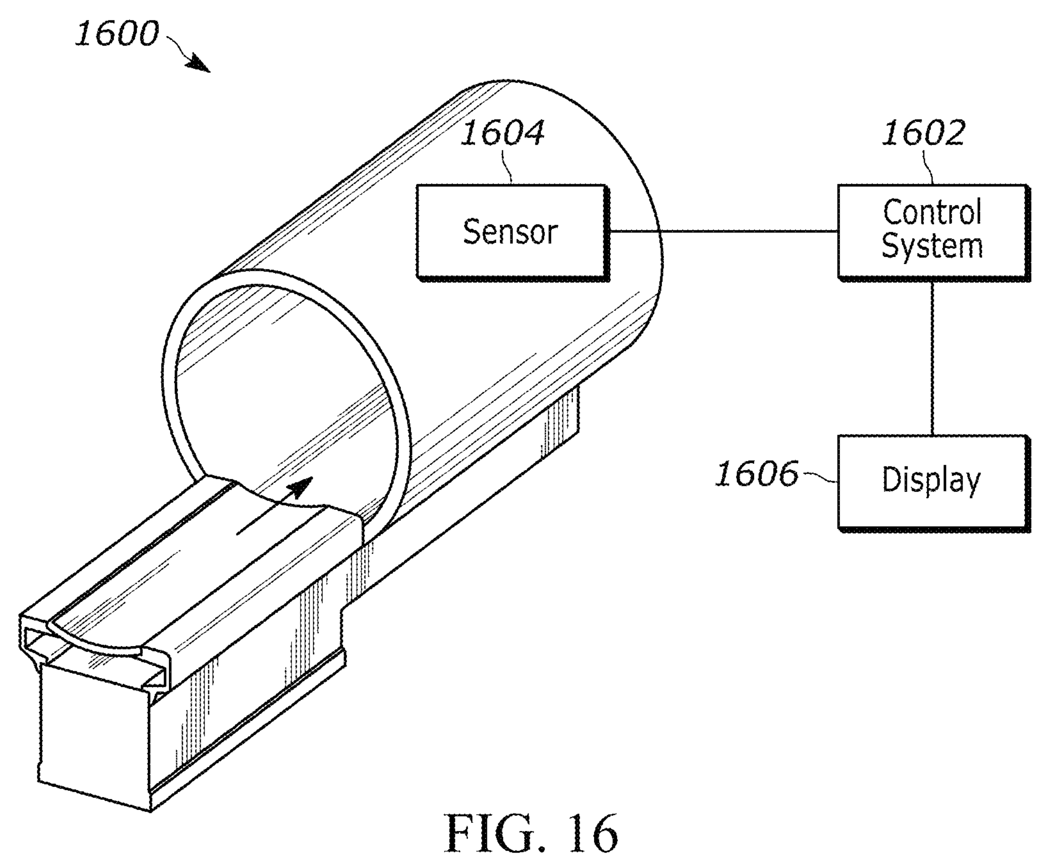
FIG. 16 is a schematic diagram of a control system configured to control a medical imaging system.

FIG. 16 depicts a schematic diagram of control system 1602 configured to control imaging system 1600, for example an Mill apparatus, x-ray imaging apparatus or ultrasonic apparatus. Sensor 1604 may, for example, be an imaging sensor. Control system 1602 may be configured to determine a classification of all or part of the sensed image. Control system 1602 may be configured to determine or select an actuator control command 20 in response to the classification obtained by the trained neural network. For example, classifier 24 may interpret a region of a sensed image to be potentially anomalous. In this case, actuator control command 20 may be determined or selected to cause display 302 to display the imaging and highlighting the potentially anomalous region.

In this embodiment, the control system 1602 would receive image and annotation information from sensor 1604. Using these and a prescribed number of classes k and similarity measure $\overline{K}$ that are stored in the system, the control system 1602 may use the method described in FIG. 10 to classify each pixel of the image received from sensor 1604. Based on this classification, signals may be sent to actuator 1606, for example, to detect anomalous regions of the image or any of the actions performed by the actuator 1606 as described in the above sections.

Figure 17:
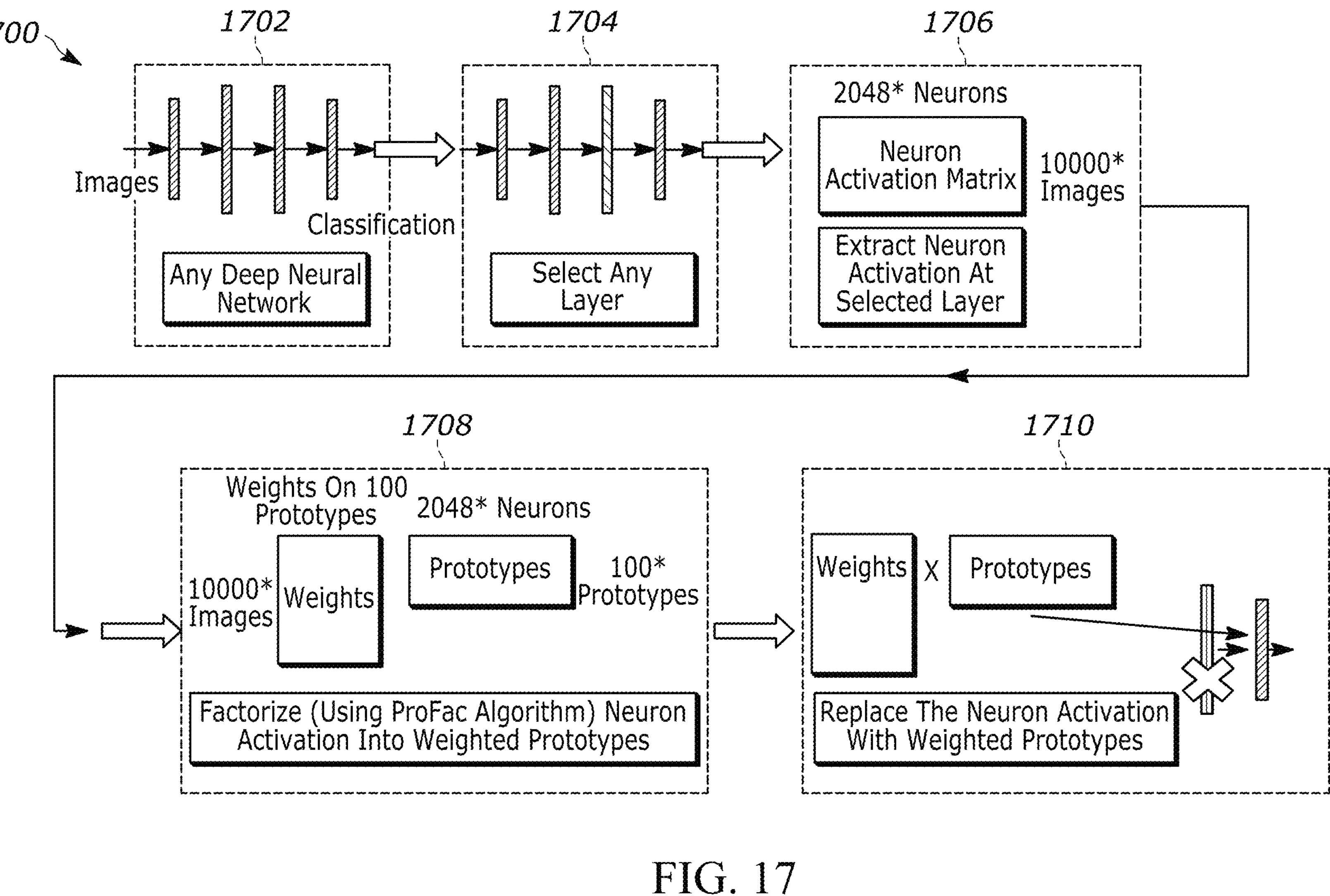
FIG. 17 is a flow diagram of a matrix factorization algorithm to factorize neuron activations in a deep neural network.

FIG. 17 illustrates the overall system workflow for image classification 1700 via a deep neural network with matrix factorization. In step 1702, a controller performs a deep neutral network classification generating a set of internal layers. In step 1704, the controller selects an internal layer. In step 1706 the controller extracts neuron activation at the selected internal layer of the deep neural network. In other words, The neuron activation matrix on that layer for a number of images are collected 1706 and factorized to obtain a set of prototypes along with their associated weights 1708. In step 1708, the controller factorizes the neuron activation using the matrix factorization algorithm (e.g., ProtoFac). Then the prototypes and weights can be used to replace the activation matrix in the original neural network to produce prediction outputs, the predictions are very similar to the original neural network output. In step 1710, the controller replaces the neuron activation with the weighted prototypes from the matrix factorization algorithm. The output can be used to identify new classes of image data.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A method to optimize a Deep Neural Network comprising:

receiving a set of images at the Deep Neural Network;

analyzing the images utilizing the Deep Neural Network;

selecting an internal layer of the Deep Neural Network that includes one or more activation matrices;

extracting neuron activations at the internal layer utilizing the one or more activation matrices of the internal layer;

factorizing the neuron activations via a matrix factorization algorithm to select prototype vectors and generate weights for each of the selected prototype vectors;

replacing the neuron activations of the internal layer with the selected prototype vectors and the weights for the selected prototype vectors;

receiving a second set of images at the deep neural network;

classifying the second set of images utilizing the Deep Neural Network and using the selected prototype vectors and the weights for the selected prototype vectors;

displaying the second set of images, the selected prototype vectors, and the weights for the selected prototype vectors;

displaying predicted results and ground truth for the second set of images analyzed by the deep neural network;

providing error images based on the predicted results and ground truth;

identifying error prototypes of the selected prototype vectors associated with the error images;

ranking error weights of the error prototypes of the error images; and outputting a new image class based on the error prototypes being one of a top ranked error weights.

2. The method of claim 1, wherein the matrix factorization algorithm further includes stochastic gradient descent (SGD).

3. The method of claim 2, wherein a batch size of the matrix factorization algorithm is less than a predetermined threshold.

4. The method of claim 1, wherein the set of images is received from an imaging sensor.

5. The method of claim 4, wherein the imaging sensor is a sensors such as a charge couple device (CCD), video, radar, LiDAR, ultrasonic, motion, microphone, strain gauge, thermal imaging, or pressure sensor.

6. The method of claim 1, further comprising, operating a physical system based on the classified second set of images, wherein the physical system is a computer-controlled machine, a robot, a vehicle, a domestic appliance, a power tool, a manufacturing machine, a personal assistant, medical equipment, or an access control system.

7. The method of claim 1, wherein the set of images is time-series data.

8. The method of claim 1, wherein the set of images is text data.

9. A system for classifying an image comprising:

a controller configured to:

receive a set of images at a deep neural network;

analyze the images utilizing the deep neural network;

select an internal layer of the deep neural network that includes one or more activation matrices;

extract neuron activations at the internal layer utilizing the one or more activation matrices of the internal layer;

factorize the neuron activations via a matrix factorization algorithm to select prototypes and generate weights for each of the selected prototypes;

replace the neuron activations of the internal layer with the selected prototypes and the weights for the selected prototypes;

receive a second set of images at the deep neural network;

classify the second set of images via the deep neural network using the selected prototypes and the weights for the selected prototypes;

display the second set of images, the selected prototypes, and the weights for the selected prototypes;

display predicted results and ground truth for the second set of images analyzed by the deep neural network;

provide error images based on the predicted results and ground truth;

identify error prototypes of the selected prototypes associated with the error images;

rank error weights of the error prototypes of the error images; and output a new image class based on the error prototypes being one of a top ranked error weights.

10. The system of claim 9, wherein the matrix factorization algorithm further includes stochastic gradient descent (SGD).

11. The system of claim 10, wherein a batch size of the matrix factorization algorithm is less than a predetermined threshold.

12. The system of claim 11 further including a sensor that is one of a charge couple device (CCD), video, radar, LiDAR, ultrasonic, motion, microphone, strain gauge, thermal imaging, or pressure sensor.

13. The system of claim 12, wherein the controller is further configures to operate a physical system based on the classified second set of images, wherein the physical system is a computer-controlled machine, a robot, a vehicle, a domestic appliance, a power tool, a manufacturing machine, a personal assistant, medical equipment, or an access control system.

14. The system of claim 9, wherein the set of images is time-series data.

15. A system for classifying a time-series image comprising:

a controller configured to:

receive a set of time-series images at the deep neural network;

analyze the set of time-series images utilizing the Deep Neural Network;

select an internal layer of the deep neural network that includes one or more activation matrices;

extract neuron activations at the internal layer utilizing the one or more activation matrices of the internal layer;

factorize the neuron activations via a matrix factorization algorithm to select prototypes and generate weights for each of the selected prototypes;

replace the neuron activations of the internal layer with the selected prototypes and the weights for the selected prototypes;

receive a second set of time-series images at the deep neural network;

classify the second set of time-series images via the deep neural network using the selected prototypes and the weights for the selected prototypes;

display the second set of time-series images, the selected prototypes, and the weights for the selected prototypes;

display predicted results and ground truth for the second set of time-series images analyzed by the deep neural network;

provide error images based on the predicted results and ground truth;

identify error prototypes of the selected prototypes associated with the error images;

rank error weights of the error prototypes of the error images; and output a new time-series image class based on the error prototypes being one of a top ranked error weights.

16. The system of claim 15, wherein the matrix factorization algorithm further includes stochastic gradient descent (SGD).

17. The system of claim 16, wherein a batch size of the matrix factorization algorithm is less than a predetermined threshold.

18. The system of claim 17 further including a sensor that is one of a charge couple device (CCD), video, radar, LiDAR, ultrasonic, motion, microphone, strain gauge, thermal imaging, or pressure sensor.

19. The system of claim 18, wherein the controller is further configures to operate a physical system based on the classified second set of images, wherein the physical system is a computer-controlled machine, a robot, a vehicle, a domestic appliance, a power tool, a manufacturing machine, a personal assistant, medical equipment, or an access control system.

20. The system of claim 19, wherein the time-series set of images is a time-series set of electro-cardiogram (ECG) images, and the one or more activation matrices is reconstructed utilizing Frobenious losses.

* * * * *